(12) United States Patent
On

(10) Patent No.: US 8,289,421 B2
(45) Date of Patent: Oct. 16, 2012

(54) IMAGE-SIGNAL PROCESSING DEVICE AND IMAGE SIGNAL PROCESSING PROGRAM

(75) Inventor: Seigo On, Tokyo (JP)

(73) Assignee: Olympus Corporation, Tokyo (JP)

( * ) Notice: Subject to any disclaimer, the term of this patent is extended or adjusted under 35 U.S.C. 154(b) by 307 days.

(21) Appl. No.: 12/631,021

(22) Filed: Dec. 4, 2009

(65) Prior Publication Data

US 2010/0182461 A1 Jul. 22, 2010

Related U.S. Application Data

(63) Continuation of application No. PCT/JP2008/060306, filed on Jun. 4, 2008.

(30) Foreign Application Priority Data

Jun. 5, 2007 (JP) .................................. 2007-149197

(51) Int. Cl.
  *H04N 5/217* (2011.01)
(52) U.S. Cl. ...................................................... 348/241
(58) Field of Classification Search .................... 348/241
  See application file for complete search history.

(56) References Cited

U.S. PATENT DOCUMENTS

| 2005/0001913 | A1 | 1/2005 | Hoshuyama |
| 2006/0061842 | A1 | 3/2006 | Oka et al. |
| 2008/0212894 | A1* | 9/2008 | Demirli et al. ................ 382/276 |

FOREIGN PATENT DOCUMENTS

| JP | 05-344530 A | 12/1993 |
| JP | 2001-157057 A | 6/2001 |
| JP | 2005-26962 A | 1/2005 |
| JP | 2005-303802 A | 10/2005 |
| JP | 2006-93753 A | 4/2006 |
| JP | 2006-319781 A | 11/2006 |

* cited by examiner

*Primary Examiner* — Chieh M Fan
*Assistant Examiner* — Dillon Durnford Geszvain
(74) *Attorney, Agent, or Firm* — Holtz, Holtz, Goodman & Chick, PC

(57) ABSTRACT

It is an object to reduce subjective noise. Provided is an image-signal processing device including an area dividing unit that divides image signals acquired by an image capturing element and subjected to predetermined image processing into a plurality of areas on the basis of color information and a noise reducing unit that performs different noise reduction processing on the individual areas of the image signals divided by the area dividing unit.

13 Claims, 20 Drawing Sheets

FIG. 6

| 1/25 | 1/25 | 1/25 | 1/25 | 1/25 |
|------|------|------|------|------|
| 1/25 | 1/25 | 1/25 | 1/25 | 1/25 |
| 1/25 | 1/25 | 1/25 | 1/25 | 1/25 |
| 1/25 | 1/25 | 1/25 | 1/25 | 1/25 |
| 1/25 | 1/25 | 1/25 | 1/25 | 1/25 |

FILTER FL1

FIG. 7

| 1/9 | 1/9 | 1/9 |
|-----|-----|-----|
| 1/9 | 1/9 | 1/9 |
| 1/9 | 1/9 | 1/9 |

FILTER FL2

FIG. 8

| 1/256 | 4/256 | 6/256 | 4/256 | 1/256 |
|---|---|---|---|---|
| 4/256 | 16/256 | 24/256 | 16/256 | 4/256 |
| 6/256 | 24/256 | 36/256 | 24/256 | 6/256 |
| 4/256 | 16/256 | 24/256 | 16/256 | 4/256 |
| 1/256 | 4/256 | 6/256 | 4/256 | 1/256 |

FILTER FL3

FIG. 9

| 1/16 | 2/16 | 1/16 |
|---|---|---|
| 2/16 | 4/16 | 2/16 |
| 1/16 | 2/16 | 1/16 |

FILTER FL4

IMAGE-SIGNAL PROCESSING DEVICE AND IMAGE SIGNAL PROCESSING PROGRAM

CROSS REFERENCE TO RELATED APPLICATIONS

This application is a continuation application of PCT/JP2008/060306 filed on Jun. 4, 2008 and claims benefit of Japanese Application No. 2007-149197 filed in Japan on Jun. 5, 2007, the contents of which is hereby incorporated by its reference.

BACKGROUND OF THE INVENTION

1. Field of the Invention

The present invention relates to image-signal processing devices and image-signal processing programs.

2. Description of Related Art

Noise components that are included in digitized signals obtained from an image capturing element and an analog circuit and an A/D converter used in combination with the image capturing element can be broadly classified into fixed-pattern noise and random noise. The fixed-pattern noise is noise caused mainly by the image capturing element, such as defective pixels. The random noise is generated at the image capturing element and the analog circuit and has characteristics similar to white noise characteristics.

For example, Japanese Unexamined Patent Application, Publication No. 2001-157057 discloses a method in which the noise level is represented as a function of the signal level, the noise level associated with the signal level is estimated with the function, and frequency characteristics for filtering are controlled on the basis of the estimated noise level, thereby reducing random noise.

In the invention of Japanese Unexamined Patent Application, Publication No. 2001-157057, the noise level N is represented by the following function.

$$N = a \cdot b^{c \cdot D} \qquad (1)$$

In equation (1) above, N is the noise level, a and b are arbitrary positive real numbers, c is an arbitrary negative real number, and D is the intensity signal value, and these values are given statically.

BRIEF SUMMARY OF THE INVENTION

A first aspect of the present invention is an image-signal processing device including an area dividing unit that divides image signals into a plurality of areas on the basis of color information and at least one noise reducing unit that performs different noise reduction processing on the individual areas of the image signals divided by the area dividing unit.

A second aspect of the present invention is an image-signal processing program for causing a computer to execute an area dividing step of dividing image signals into a plurality of areas on the basis of color information and a noise reducing step of performing different noise reduction processing on the individual areas of the divided image signals.

BRIEF DESCRIPTION OF THE SEVERAL VIEWS OF THE DRAWINGS

FIG. 6 is a diagram showing an example of an average filter.

FIG. 7 is a diagram showing an example of an average filter.

FIG. 8 is a diagram showing an example of a weighted average filter.

FIG. 9 is a diagram showing an example of a weighted average filter.

DETAILED DESCRIPTION OF THE INVENTION

Now, an embodiment of an image-signal processing device, an image-signal processing program, and an image capturing apparatus according to the present invention will be described with reference to the drawings.

First Embodiment

Figure 1:
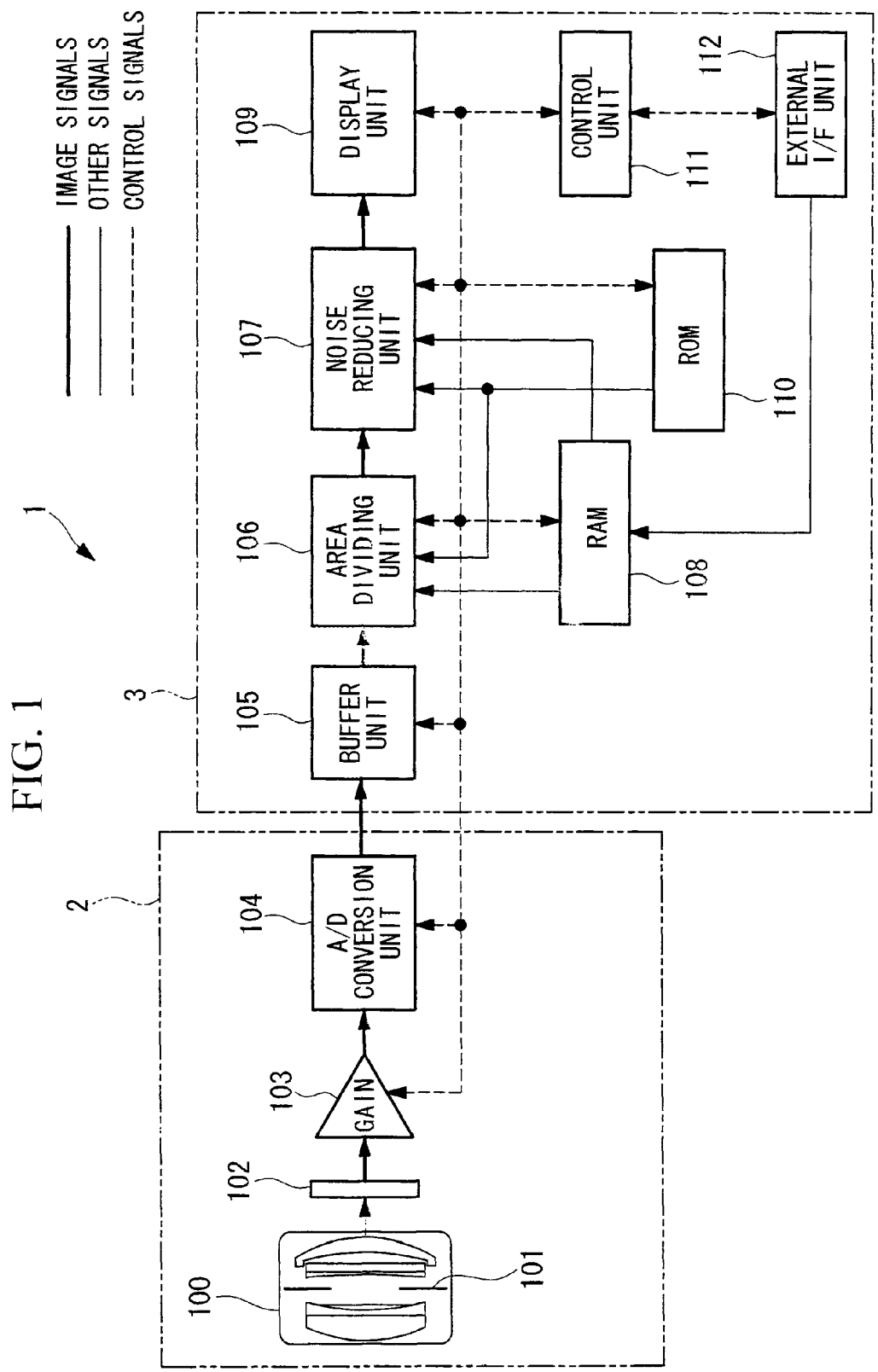
FIG. 1 is a block diagram schematically showing the configuration of an image capturing apparatus according to a first embodiment of the present invention.

FIG. 1 is a diagram schematically showing the configuration of an image capturing apparatus according to a first embodiment of the present invention.

As shown in FIG. 1, an image capturing apparatus 1 according to this embodiment includes an image capturing unit 2 and an image-signal processing device 3.

The image capturing unit 2 includes a lens system 100, a diaphragm 101, a CCD 102, a gain 103, and an A/D conversion unit 104 as its main components.

The image-signal processing device 3 includes a buffer unit 105, an area dividing unit 106, a noise reducing unit 107, a RAM 108, a display unit 109, a ROM 110, a control unit 111, and an external I/F (interface) unit 112 as its main components.

In the image-signal processing device 3, the RAM 108 is connected to the area dividing unit 106 and the noise reducing unit 107. The ROM 110 is connected to the area dividing unit 106 and the noise reducing unit 107. The control unit 111 is bidirectionally connected to the gain 103, the A/D conversion unit 104, the buffer unit 105, the area dividing unit 106, the noise reducing unit 107, the RAM 108, the display unit 109, the ROM 110, and the external I/F unit 112.

In the image capturing apparatus 1 configured as described above, when a shutter button provided on the external I/F unit 112, which is not shown, is pressed by a user, image signals are captured time-sequentially via the lens system 100, the diaphragm 101, the CCD 102, and the gain 103. In this embodiment, it is assumed that the image signals are color image signals consisting of three components representing red (R), green (G), and blue (B). The RGB image signals that have been converted into digital signals by the A/D conversion unit 104 are transferred to the buffer unit 105 of the image-signal processing device 3.

The area dividing unit 106 reads out RGB image signals from the buffer unit 105 and reads out area division information from the ROM 110 on the basis of control signals from the control unit 111. Then, on the basis of the area division information, the area dividing unit 106 divides the RGB image signals read out from the buffer unit 105 into a plurality of areas.

Here, the area division information is, for example, a table in which information of color areas that are considered as important is registered, and the area division information will be described later in detail.

The image signals divided into a plurality of areas by the area dividing unit 106 are transferred to the noise reducing unit 107. The noise reducing unit 107 executes different noise reduction processing on the individual areas of the image signals transferred thereto and transfers the processed image signals to the display unit 109. Accordingly, the processed image signals are displayed on the display unit 109.

Figure 2:
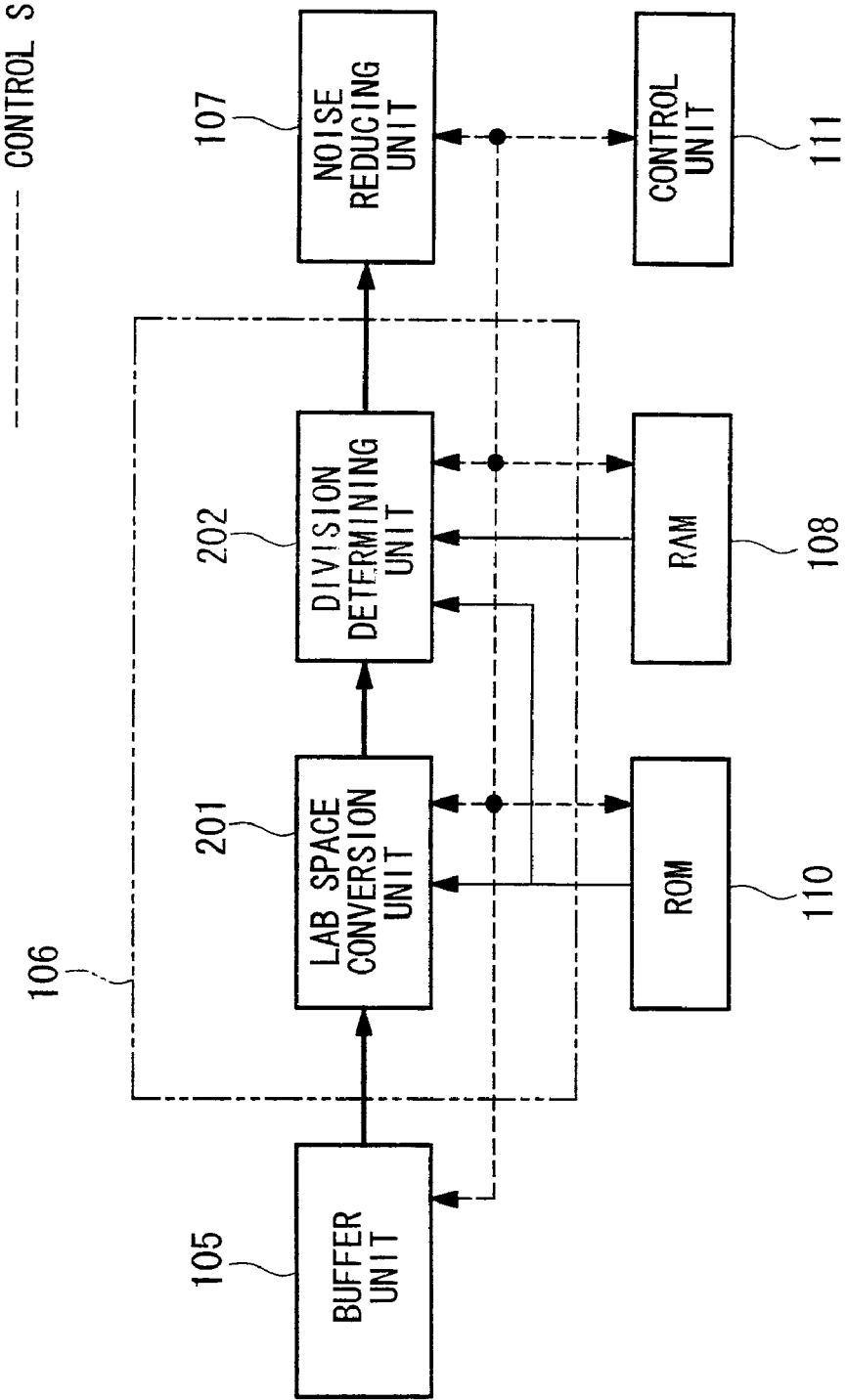
FIG. 2 is a block diagram showing an example configuration of an area dividing unit shown in FIG. 1.

FIG. 2 is a diagram showing an example configuration of the area dividing unit 106. As shown in FIG. 2, the area dividing unit 106 includes an Lab space conversion unit 201 and a division determining unit 202. The Lab space conversion unit 201 is connected to the ROM 110. The division determining unit 202 is connected to the RAM 108 and the ROM 110. Furthermore, the Lab space conversion unit 201 and the division determining unit 202 are bidirectionally connected to the control unit 111. In the ROM 110, a conversion table for converting RGB signals into L*a*b* signals and area division information are stored.

For example, the conversion table is expressed by expression (1) below.

[Expression 1]

$$\begin{bmatrix} R \\ G \\ B \end{bmatrix} \xrightarrow[\text{for } L*a*b \text{ conversion}]{LUT} \begin{bmatrix} L \\ a \\ b \end{bmatrix} \quad (1)$$

In the area dividing unit 106 configured as described above, the Lab space conversion unit 201 reads out the conversion table from the ROM 110 and performs color conversion processing, on the basis of the conversion table, on each pixel of the RGB image signals transferred from the buffer unit 105.

The L*a*b* image signals yielded through the color conversion by the Lab space conversion unit 201 and the RGB image signals before the conversion are transferred to the division determining unit 202 under the control of the control unit 111.

The division determining unit 202 reads out area division information from the ROM 110 and divides the L*a*b* image signals on the basis of color information by using the area division information.

Now, the area division information will be described in detail.

For example, in the case of ordinary portrait capturing, yellow, which represents the color of the skin, and blue and cyan, which represent the color of the sky, are considered as important. Here, since subjective perception is more sensitive to the noise levels in areas of the skin color and the sky color than to the noise levels in areas of other colors even when the luminance S/N ratios are the same, it is desired to perform more intense noise reduction processing for the skin-color and sky-color areas than for the other color areas so that as much smoothness as possible is achieved.

Thus, in this embodiment, information of color areas that are considered as important is stored in advance in the ROM 110 as area division information. Accordingly, for pixels corresponding to the color areas registered in the area division information, it becomes possible to execute noise reduction processing different from that for other pixels in the noise reducing unit 107 at the subsequent stage.

Figure 3:
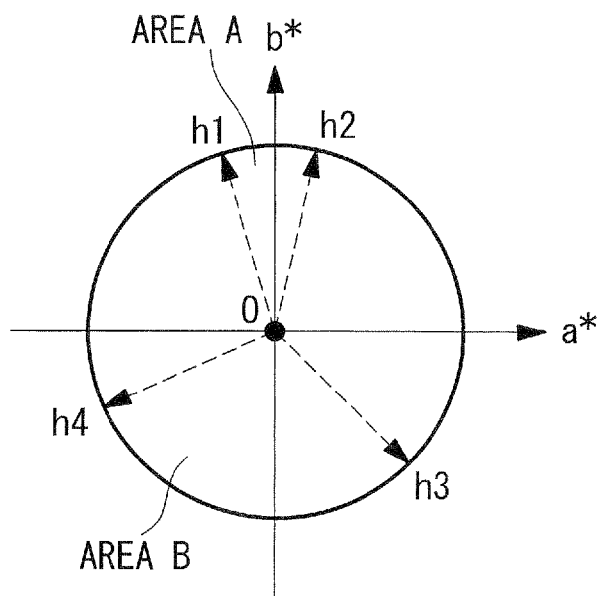
FIG. 3 is an explanatory diagram for explaining area division information.

Specifically, in the case of ordinary portrait capturing, as shown in FIG. 3, a lower-limit hue angle h1 and an upper-limit hue angle h2 of the skin-color area (area A in FIG. 3) and a lower-limit hue angle h3 and an upper-limit hue angle h4 of the sky-color area (area B in FIG. 3) in the L*a*b* color space are registered in the area division information as color areas that are considered as important.

As another example, with image signals related to medicine (e.g., endoscope images), red, which represents blood, blood vessels, and internal organs, and yellow, which represents fat, are considered as important. Since the elimination of thin blood vessels and fine structures through noise reduction processing would pose an obstacle to diagnosis, for color areas of blood, internal organs, blood vessels, and fat, it is desired to perform less intense noise reduction processing than for the other color areas so that thin blood vessels and fine structures can be maintained as much as possible.

Figure 4:
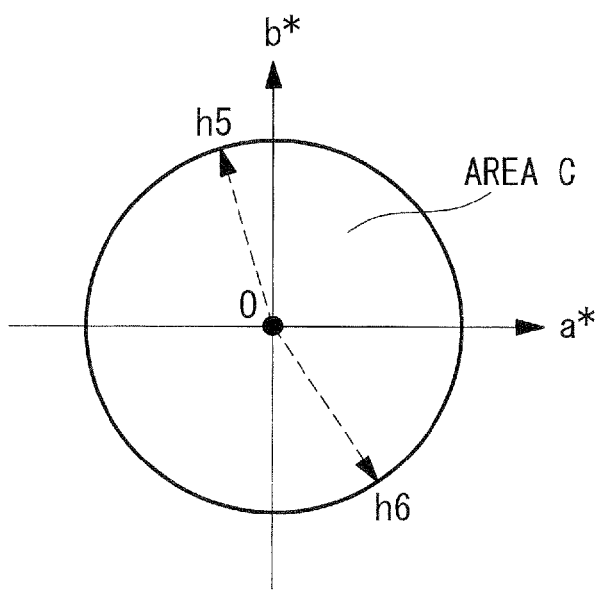
FIG. 4 is an explanatory diagram for explaining area division information.

Thus, in the case of such endoscope images, as shown in FIG. 4, a lower-limit hue angle h5 and an upper-limit hue angle h6 of the color area of blood, internal organs, blood vessels, and fat (area C in FIG. 4) in the L*a*b* color space are registered in the area division information as a color area that is considered as important.

Here, color areas that are considered as important vary depending on image capturing types, as in the above-described cases of portrait images and endoscope images. Therefore, individual image capturing types and pieces of area division information may be stored in the ROM 110 in association with each other so that the area division information associated with the image capturing type at the time of acquisition of RGB image signals can be read out from the ROM 110 and used. The image capturing types refer to information that enables identification of different features of acquired image signals, for example, variation of image capturing elements, variation of image capturing modes, such as a portrait capturing mode and a night scene capturing mode, or the like.

Furthermore, the area division information stored in the ROM 110 can be set and changed, for example, by a user operating the external I/F unit 112. Alternatively, instead of the mode where the area division information is stored in the ROM 110, for example, area division information input by the user may be temporarily stored in the RAM 108 so that the division determining unit 202 can read out and use the area division information from the RAM 108 under the control of the control unit 111 at the time of image signal processing.

Upon reading out from the ROM 110 the area division information associated with the image capturing type of RGB image signals, the division determining unit 202 compares a hue angle h of each pixel of L*a*b* image signals yielded through color conversion by the Lab space conversion unit 201 with the upper-limit hue angle and the lower-limit hue angle of each area read out from the ROM 110 to determine whether the pixel belongs to any color area that is considered as important.

Here, the hue angle h of each pixel is given by equation (2) below:

$$h = \arctan(b^*/a^*) \quad (2)$$

For example, in the case of portrait capturing, if the hue angle h of the pixel is greater than or equal to the lower-limit hue angle h1 and less than or equal to the upper-limit hue angle h2, it is determined that the pixel belongs to the skin-color area, and if the hue angle h of the pixel is greater than or equal to the lower-limit hue angle h3 and less than or equal to the upper-limit hue angle h4, it is determined that the pixel belongs to the sky-color area.

Upon extracting image signals belonging to the color areas considered as important from the L*a*b* image signals yielded through color conversion by the Lab space conversion unit 201 as described above, the division determining unit 202 transfers information of the extracted image signals together with the original RGB image signals to the noise reducing unit 107.

Figure 5:
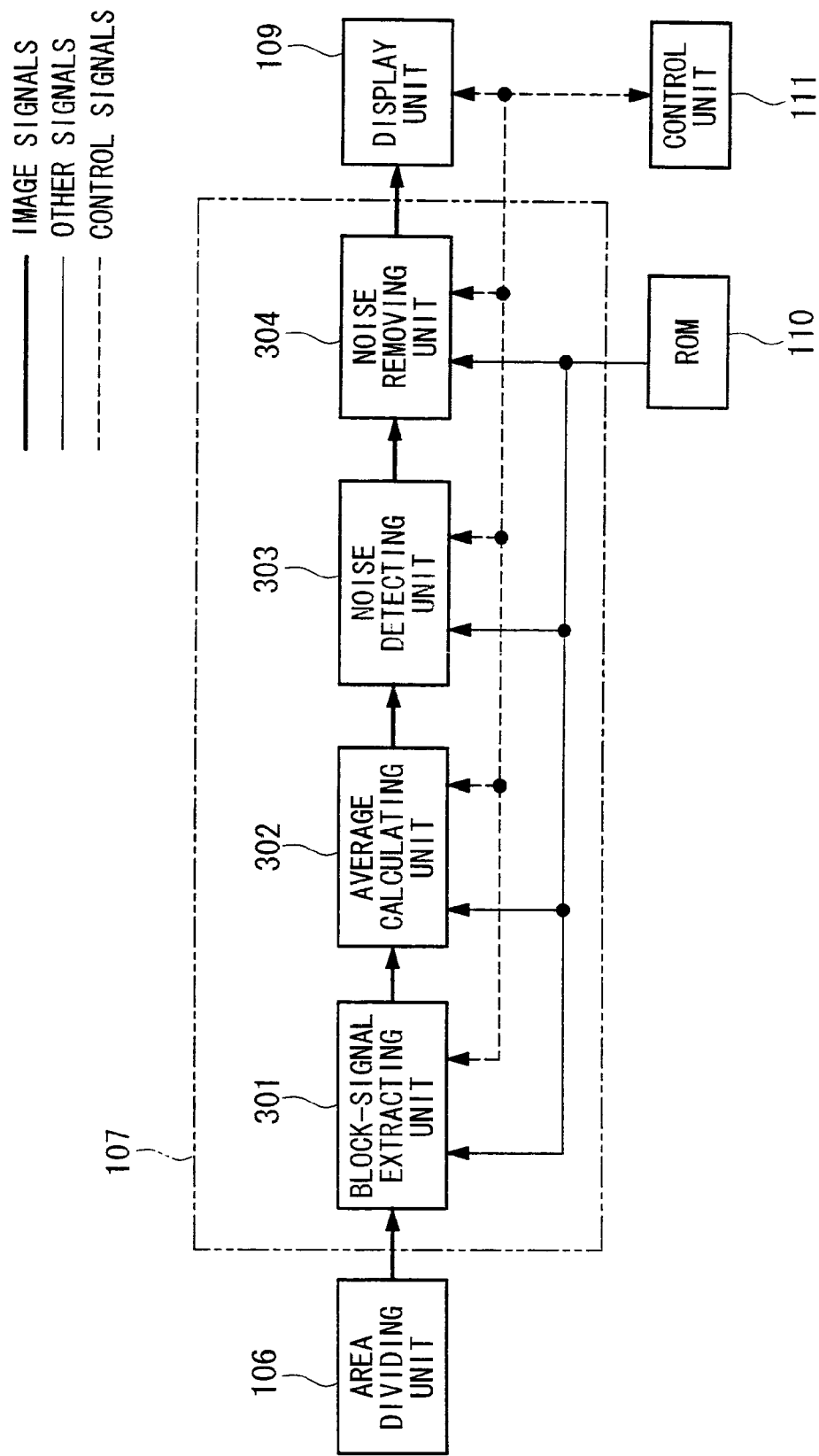
FIG. 5 is a block diagram showing an example configuration of a noise reducing unit shown in FIG. 1.

FIG. 5 is a diagram showing an example configuration of the noise reducing unit 107. As shown in FIG. 5, the noise reducing unit 107 is formed of a block-signal extracting unit 301, an average calculating unit 302, a noise detecting unit 303, and a noise removing unit 304. The components of the noise reducing unit 107 are individually connected to the ROM 110 and the control unit 111 in such a configuration that bidirectional communication can be carried out.

On the basis of the image signals belonging to the color areas considered as important, transferred from the area dividing unit 106, for each pixel of the RGB image signals transferred simultaneously therewith, the block-signal extracting unit 301 extracts block signals centered around the pixel and having a predetermined size. At this time, the block-signal extracting unit 301 varies the block size depending on whether the pixel of interest belongs to a color area that is considered as important. The block-signal extracting unit 301 transfers the original image signals, the image signals belonging to important color areas, and the extracted block signals to the average calculating unit 302.

For each pixel that has been transferred, the average calculating unit 302 calculates average values of the corresponding block signals. For example, in the case of ordinary portrait capturing, for block signals with which the pixel of interest belongs to the skin-color area or the sky-color area, an average filter FL1 shown in FIG. 6 is extracted from the ROM 110, and average values of the block are calculated individually for R, G, and B color signals by using the average filter FL1.

On the other hand, for block signals with which the pixel of interest does not belong to the skin-color area or the sky-color area, an average filter FL2 shown in FIG. 7 is extracted from the ROM 110, and average values of the block are calculated individually for R, G, and B color signals by using the average filter FL2.

In the case of image signals related to medicine, for block signals with which the pixel of interest has colors representing blood, blood vessels, internal organs, and fat, average values of the block are calculated individually for R, G, and B color signals by using the average filter FL2 shown in FIG. 7.

On the other hand, for block signals with which the pixel of interest has colors other than the colors representing blood, blood vessels, internal organs, and fat, average values of the block are calculated individually for R, G, and B color signals by using the average filter FL1 shown in FIG. 6.

As described above, it is desired that the noise filters to be used are also registered individually in relation to image capturing types and whether the pixel of interest corresponds to a color area that is considered as important.

Instead of using simple average values, increasing weights may be given to pixels closer to the pixel of interest. In this case, instead of the average filters FL1 and FL2 shown in FIGS. 6 and 7, weighted average filters FL3 and FL4 shown in FIGS. 8 and 9 may be used.

Upon obtaining average values (hereinafter referred to as "pixel average values") for each set of block signals, the average calculating unit 302 transfers the average values and the original image signals to the noise detecting unit 303.

Figure 10:
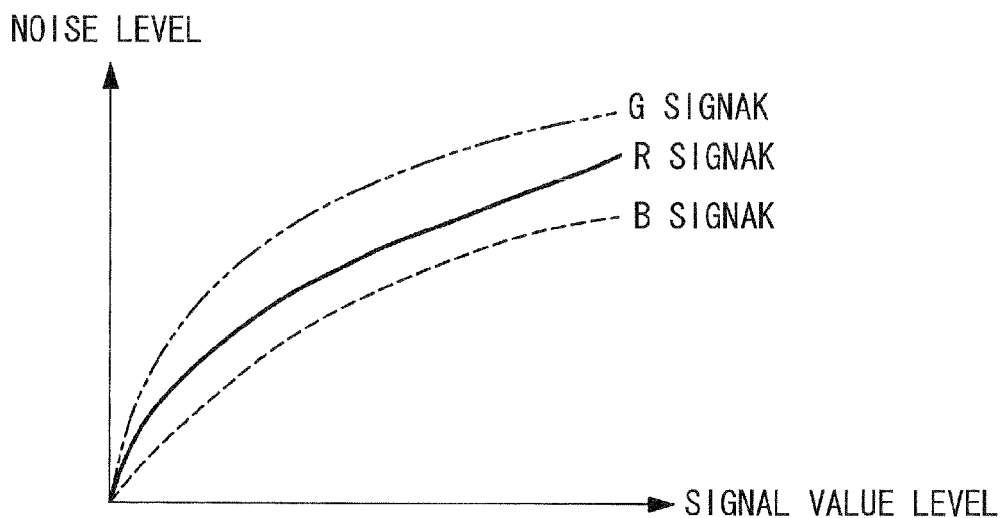
FIG. 10 is a diagram showing a signal level to noise level relationship.

The noise detecting unit 303 reads out noise model information from the ROM 110 and estimates noise levels by using the individual pixel average values transferred from the average calculating unit 302. In this embodiment, signal-level-to-noise-level association tables (see FIG. 10) corresponding to the CCD 102 and individually provided for R, G, and B color signals, i.e., noise model data, are stored in the ROM 110. In the case of 8-bit image signals, 768 (3*256) noise level patterns individually corresponding to R, G, and B image signal values ranging from 0 to 255 are stored in the ROM 110.

Instead of using the noise model data, noise detection may be performed by using a reference noise model, as disclosed in Japanese Unexamined Patent Application, Publication No. 2005-303802. In this case, representative points of signal value level (Level) to noise level (Noise) of the reference noise model and gradient information representing gradients of segments between the individual representative points are stored in the ROM 110, and at the time of noise level detection, noise levels are estimated through processing such as interpolation by using the representative points of noise levels and the gradient information representing gradients. This serves to reduce the hardware load.

Upon estimating noise levels associated with the individual pixel average values, the noise detecting unit 303 transfers the noise levels and average pixel values of each pixel together with the original image signals to the noise removing unit 304.

By using the noise levels and pixel average values transferred from the noise detecting unit 303, the noise removing unit 304 performs noise removal processing. In the noise removal processing, for a signal level (Rx) at a certain position, by using the noise level (NR) and the average value (Rav), for example, calculation is performed according to expressions (3) below, and an image signal Rx' after the noise removal processing is output to the display unit 109.

If $(Rx>Rav+NR/2) \rightarrow Rx'=Rx-NR/2$

If $(Rav+NR/2>Rx>Rav-NR/2) \rightarrow Rx'=Rx$

If $(Rx<Rav-NR/2) \rightarrow Rx'=Rx+NR/2$ (3)

By adjusting weights for noise reduction by using expressions (4) below instead of expressions (3) above, it becomes possible to control the degree of noise reduction. In expressions (4), K is a constant. Regarding the constant K, a plurality of adjustment constants K may be stored in the ROM 110 so that the user can select one of the constants K at his/her discretion, via the external I/F unit 112, or the user may input a constant K by himself/herself via the external I/F unit 112.

If $(Rx>Rav+K*NR/2) \rightarrow Rx'=Rx-K*NR/2$

If $(Rav+K*NR/2>Rx>Rav-K*NR/2) \rightarrow Rx'=Rx$

If $(Rx<Rav-K*NR/2) \rightarrow Rx'=Rx+K*NR/2$ (4)

Alternatively, instead of using the noise model data described earlier, the noise removing unit 304 may output the average values of the block signals for the pixel of interest, having the predetermined size, as image signals after the noise reduction.

As described hereinabove, with the image-signal processing device and image capturing apparatus according to this embodiment, for example, in the case of ordinary portrait capturing, noise reduction processing is performed by calculating average values with average filters or weighted average filters larger than a predetermined size for image signals corresponding to the skin-color area and the sky-color area in the noise reduction processing described above, so that noise in these areas can be removed sufficiently. Furthermore, noise reduction processing is performed with the predetermined size for the other areas, so that it is possible to reduce noise while maintaining edge components in the areas.

As another example, in the case of image signals related to medicine, for color areas of parts that are important for medical diagnosis, such as blood vessels, blood, internal organs, and fat, noise reduction processing is performed with average filters or weighted average filters having a predetermined size, so that thin blood vessels, fine patterns, and so forth are maintained. On the other hand, for the other areas, noise reduction processing is performed with average filters or weighted average filters larger than the predetermined size, so that noise can be removed sufficiently.

As described above, with the image-signal processing device and image capturing apparatus according to this embodiment, image signals are divided into important color areas and other areas on the basis of color information of the image signals, and noise reduction processing is performed by calculating average values with smoothing filters of different sizes for these areas, so that it is possible to reduce subjective noise components.

Although the image capturing apparatus 1 having a configuration in which the image capturing unit 2 including the lens system 100, the diaphragm 101, the CCD 102, the gain 103, and the A/D conversion unit 104 is integrated therein has been described in this embodiment, the configuration of the image capturing apparatus 1 need not be limited to such a configuration, and the image capturing unit 2 may be separate.

That is, image signals captured by a separate image capturing unit 2 and recorded on a recording medium such as a memory card in the form of unprocessed RAW data may be read out from the recording medium and processed by the image-signal processing device 3.

At this time, however, it is presupposed that information at the time of image capturing (ISO speed, white balance coefficient, etc.) is recorded in a header section or the like. Transmission of various types of information from the separate image capturing unit 2 to the image-signal processing device 3 may be carried out via a communication circuit or the like, without limitation to the transmission via the recording medium.

Furthermore, although image signal processing by hardware is presupposed in this embodiment, there is no limitation to such a configuration. For example, it is possible to record signals from the CCD 102 on a computer-readable recording medium such as a memory card in the form of unprocessed RAW data and to record information at the time of image capturing (ISO speed, white balance coefficient, etc.) from the control unit 111 on the recording medium as header information, and to then cause a computer to execute an image-signal processing program, which is separate software, so that the computer reads the information on the recording medium and performs processing.

Furthermore, similarly to the case described above, transmission of various types of information from the image capturing unit 2 to the computer may be carried out via a communication circuit or the like, without limitation to transmission via the recording medium.

Figure 11:
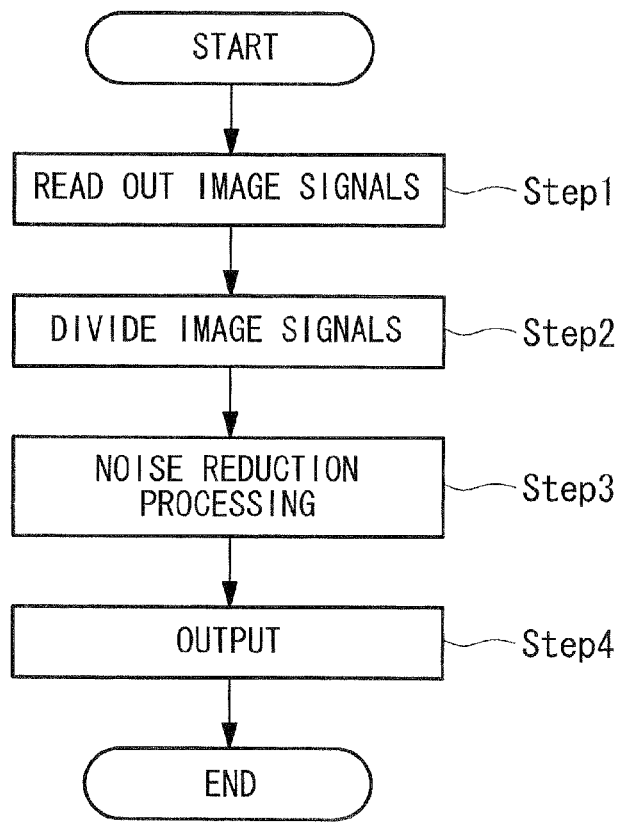
FIG. 11 is a flowchart showing a processing procedure of an image-signal processing program according to the first embodiment of the present invention.

FIG. 11 is a flowchart showing processing according to the image-signal processing program.

First, RGB image signals, the header information, and so forth are read out from the recording medium or the like, and information such as γ characteristic data included in advance in the image-signal processing program is read out (Step 1).

Then, on the basis of a predetermined parameter, processing for dividing the RGB image signals that have been read out is performed (Step 2). This processing corresponds to the processing performed by the area dividing unit 106 described earlier.

Then, on the basis of the area division information of Step 2, noise reduction processing is performed on each pixel (Step 3). This processing corresponds to the processing performed by the noise reducing unit 107 described earlier.

Finally, noise-reduced image signals are output and displayed on the display unit 109 or stored on a memory card or the like (Step 4), thus completing the processing.

Figure 12:
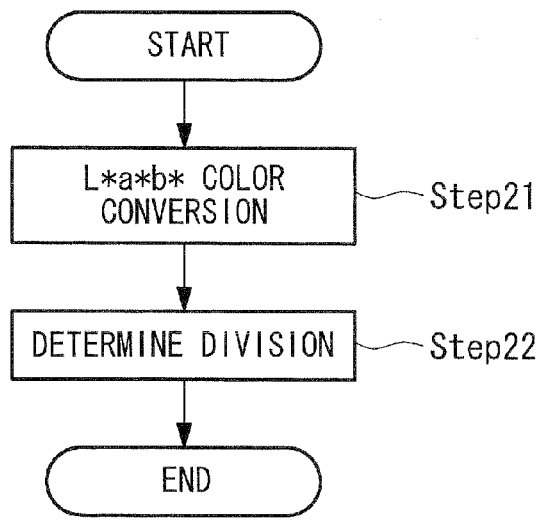
FIG. 12 is a flowchart showing a processing procedure of the image-signal processing program according to the first embodiment of the present invention.

Next, FIG. 12 is a flowchart showing details of the area division processing in Step 2 of FIG. 11.

First, a predetermined color conversion table (e.g., see expression (1) given earlier) is extracted, and RGB image signals are converted into L*a*b* image signals on the basis of the color conversion table (Step 21). This processing corresponds to the processing performed by the Lab space conversion unit 201.

Then, processing for dividing the image signals is performed by extracting predetermined area division information and determining whether each pixel of the image signals that have been read belongs to a color area that is considered as important (Step 22). This processing corresponds to the processing performed by the division determining unit 202. Then, upon completion of the processing in Step 22, Step 3 of the main flow shown in FIG. 11 is executed.

Figure 13:
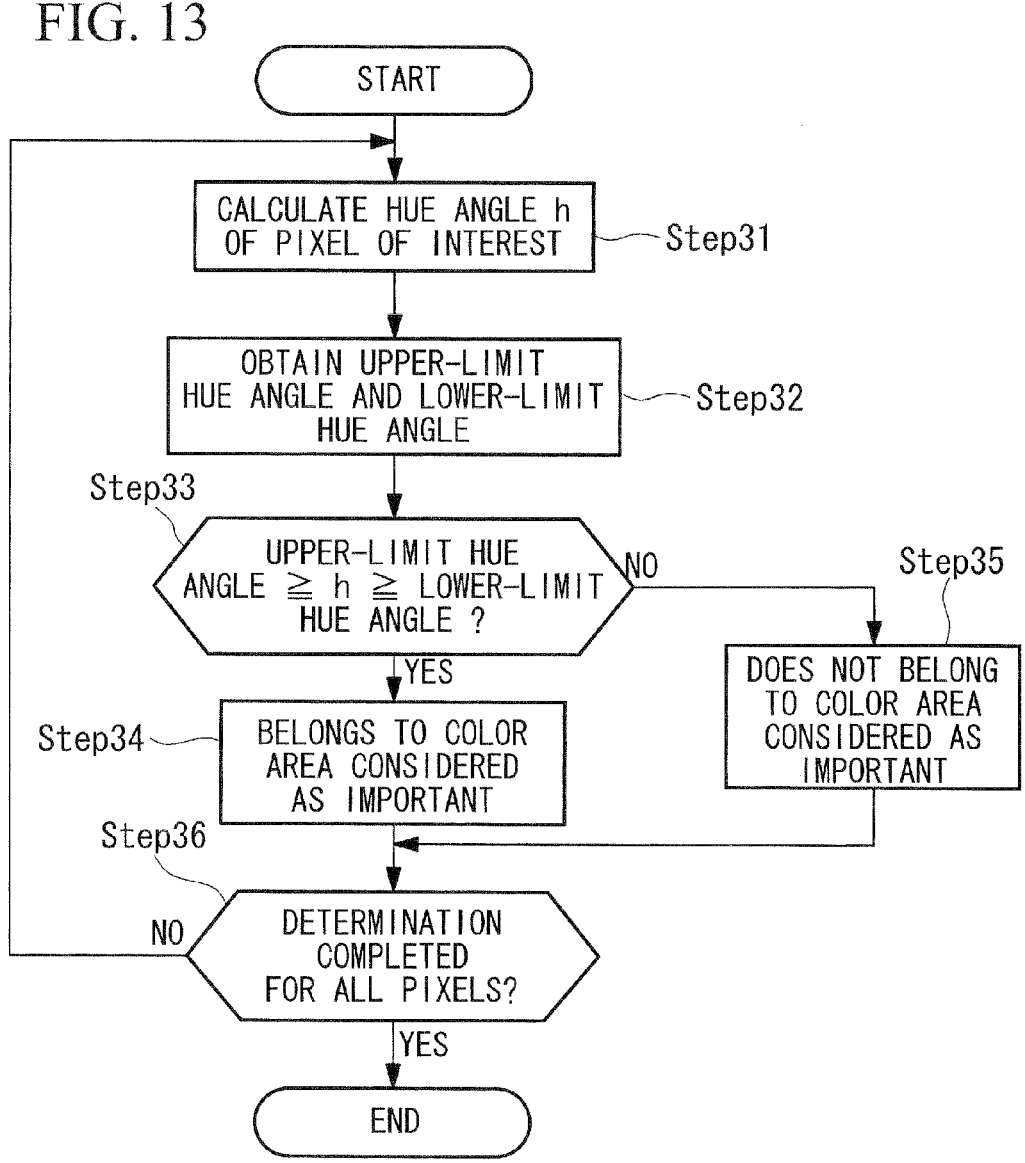
FIG. 13 is a flowchart showing a processing procedure of the image-signal processing program according to the first embodiment of the present invention.

FIG. 13 is a flowchart showing details of the division determining processing in Step 22 of FIG. 12.

First, on the basis of equation (2) given earlier, the hue angle h is calculated for each pixel of the image signals that have been read (Step 31). Then, the upper-limit hue angle and lower-limit hue angle of each color area that is considered as important are obtained from the area division information (Step 32). Then, by using the hue angle h for each pixel, calculated in Step 31, processing for comparison with the upper-limit hue angle and lower-limit hue angle extracted in Step 32 is performed (Step 33).

In Step 33, if the hue angle h is greater than or equal to the lower-limit hue angle and less than or equal to the upper-limit hue angle, the processing proceeds to Step 34 where it is determined that the pixel belongs to the color area considered as important. On the other hand, if the hue angle h does not fall in the above range in Step 33, the processing proceeds to Step 35 where it is determined that the pixel does not belong to the color area considered as important. Then, in Step 36, it is determined whether the determination has been completed for all the pixels. If the determination has not been completed, the processing returns to Step 31 and the same processing is performed for another pixel of interest. If the determination has been completed, the division determining processing is completed.

Figure 14:
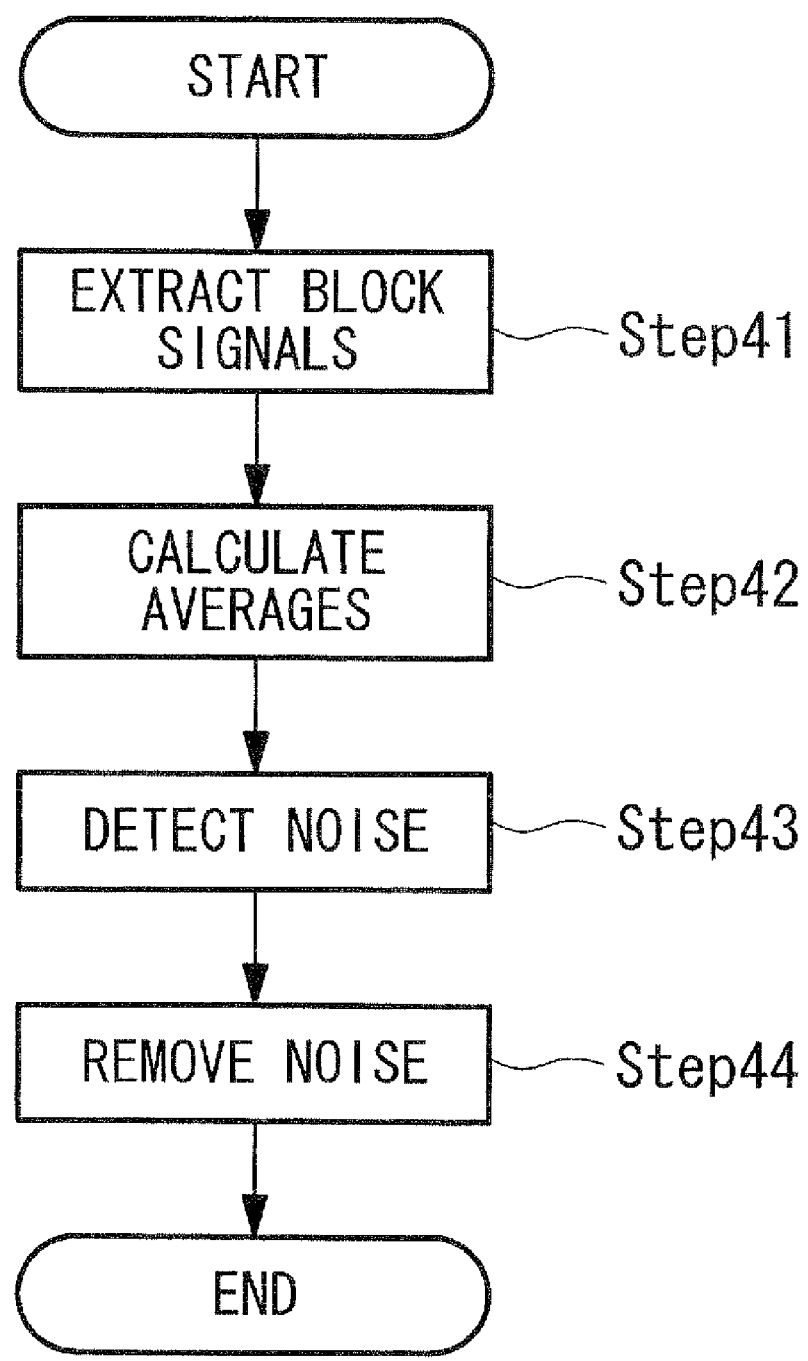
FIG. 14 is a flowchart showing a processing procedure of the image-signal processing program according to the first embodiment of the present invention.

FIG. 14 is a flowchart showing details of the noise reduction processing in Step 3 of FIG. 11.

First, on the basis of determination information of a specific area from Step 2 shown in FIG. 11, block signals centered around a pixel of interest are extracted from the RGB image signals that have been read. If the pixel of interest belongs to the specific area, block signals of a predetermined size a are extracted individually for R, G, and B color signals. If the pixel of interest does not belong to the specific area, block signals of a predetermined size b are extracted individually for R, G, and B color signals (Step 41). This processing corresponds to the processing performed by the block-signal extracting unit 301.

Then, if the pixel of interest belongs to the specific color area, average values of R, G, and B color block signals of the size a, extracted in Step 41, are calculated by using the predetermined smoothing filter FL1. If the pixel of interest does not belong to the specific color area, average Values of R, G, and B color block signals of the size b, extracted in Step 41, are calculated by using the predetermined smoothing filter FL2 (Step 42). This processing corresponds to the processing performed by the average calculating unit 302.

Then, the noise levels of the pixel of interest are estimated by using the average values calculated in Step 42. For example, the signal-level-to-noise-level association tables (see FIG. 10) corresponding to the COD 102 and individually provided for R, G, and B color signals are extracted, and the noise levels of R, G, and B signal values of the pixel of interest are calculated (Step 43). This processing corresponds to the processing performed by the noise unit 303.

Then, noise removal processing is performed on the basis of the noise levels estimated in Step 43 (Step 44). For example, the noise removal processing is performed on a pixel-by-pixel basis by using expressions (3) or (4) given earlier. This processing corresponds to the processing performed by the noise removing unit 304.

Upon completion of the processing in Step 44, the processing then returns to the main flow shown in FIG. 11, and the output processing in Step 4 is performed.

Second Embodiment

Next, an image-signal processing device and an image capturing apparatus according to a second embodiment of the present invention will be described.

The image-signal processing device according to this embodiment differs from the image-signal processing device according to the first embodiment described above in that the area dividing unit further includes an illumination-information extracting unit.

Now, the image-signal processing device according to this embodiment will be described mainly regarding differences while omitting a description of common points with the first embodiment.

Figure 15:
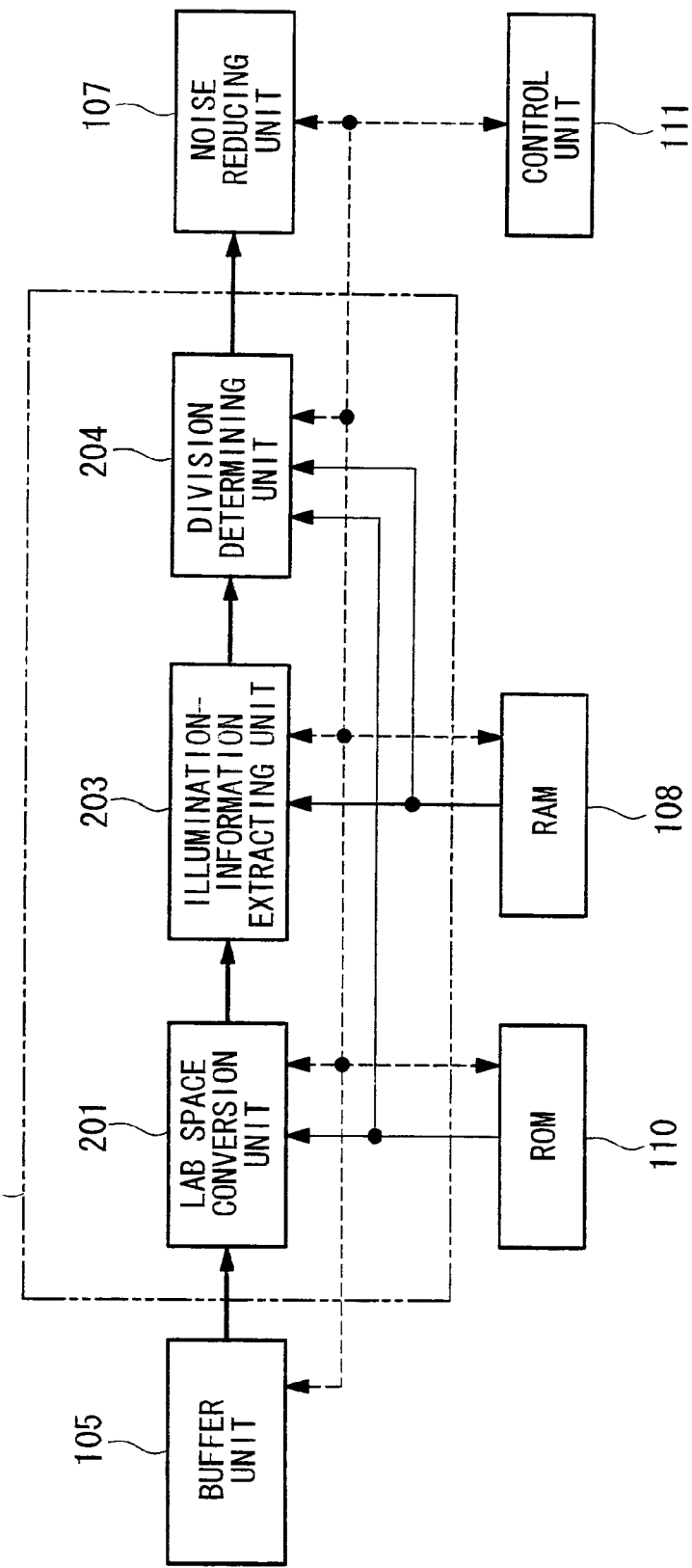
FIG. 15 is a block diagram showing an example configuration of an area dividing unit according to a second embodiment of the present invention.

FIG. 15 is a diagram showing an example configuration of an area dividing unit 406 according to the second embodiment of the present invention. As shown in FIG. 15, the area dividing unit 406 according to this embodiment includes an illumination-information extracting unit 203 in addition to the components of the area dividing unit 106 according to the first embodiment shown in FIG. 2.

The ROM 110 has recorded thereon illumination information in addition to the types of information described earlier. Here, for example, the illumination information is information input from the external I/F unit 112 by the user in advance of image capturing.

In this configuration, the illumination-information extracting unit 203 receives original image signals and L*a*b* image signals from the Lab space conversion unit 201. The illumination-information extracting unit 203 reads out illumination information from the RAM 108 and transfers the illumination information that has been read out together with the original image signals and L*a*b* image signals transferred from the Lab space conversion unit 201 to the division determining unit 204.

Here, the illumination light source used for image capturing significantly affects the subjective appearance of noise. Thus, there exists a possibility that the range of color areas where noise appears intensely varies subjectively depending on the illumination light source. The cause of this situation is the different spectral distributions of individual illumination light sources.

Figure 16:
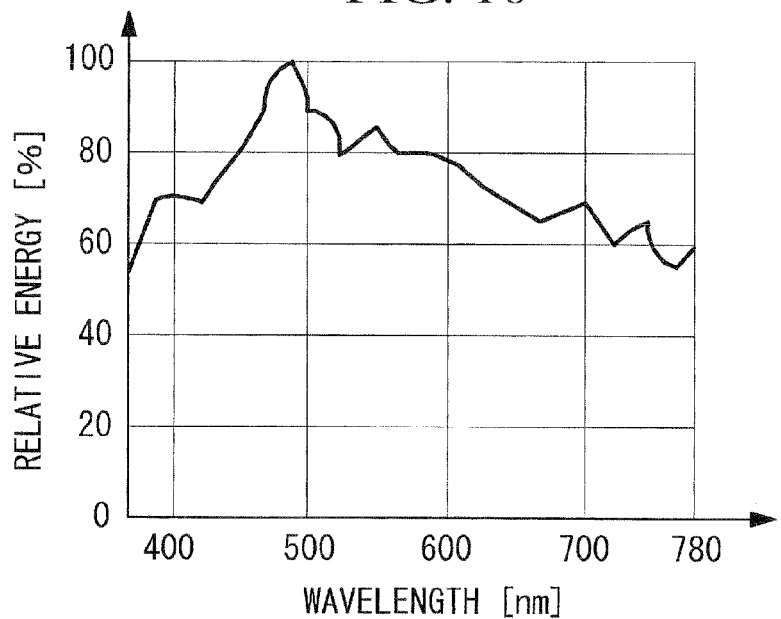
FIG. 16 is a diagram showing an example spectral distribution of daylight.
Figure 17:
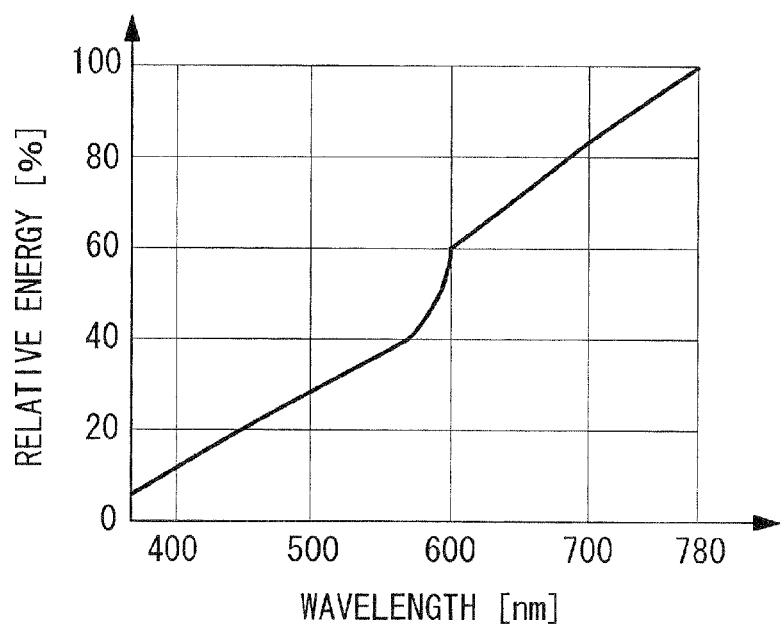
FIG. 17 is a diagram showing an example spectral distribution of incandescent light.

For example, the spectral distribution of daylight, shown in FIG. 16, differs from the spectral distribution of incandescent light, shown in FIG. 17. That is, when illumination light sources having different spectral distributions are used, the colors of images also differ due to the different spectral distributions. This causes a difference in the apparent image quality in the same area of images of the same object captured with the two illumination light sources.

Therefore, in this embodiment, noise reduction processing is performed in consideration of the difference in image quality due to the difference in illumination light sources so that images with a more natural image quality can be provided.

Specifically, the ROM 110 stores upper-limit hue angles and lower-limit hue angles for area division for each piece of illumination information. For example, in the case of ordinary portrait capturing, as described earlier, yellow, which represents the skin color, and blue and cyan, which represent the sky color, are considered as important, so that the upper-limit hue angles and lower-limit hue angles for these areas are stored in the ROM 110, and different values are defined as the upper-limit hue angles and lower-limit hue angles in accordance with the illumination information used for image capturing.

The division determining unit 202 reads out the upper-limit hue angles and lower-limit hue angles associated with the illumination information input from the illumination-information extracting unit 203 from the ROM 110 and determines whether each pixel of the image signals belongs to the color areas considered as important by using the upper-limit hue angles and lower-limit hue angles that have been read out. Then, the division determining unit 202 extracts image signals belonging to the color areas considered as important and transfers the extracted image signals together with the original RGB image signals to the noise reducing unit 107.

Thus, the noise reducing unit 107 can perform suitable noise reduction processing in accordance with the illumination. Specifically, for areas where the appearance of noise is rather intense, it is possible to reduce the noise level sufficiently by performing intense noise reduction processing with a smoothing filter larger than a predetermined size.

In the case of fields related to medicine, for the purpose of early discovery of minute lesions such as cancer or detailed diagnosis of lesion regions before an operation, special light sources are often used. For example, in the case of observation with narrow-band light, by irradiation with light having two narrow-band wavelengths that are easily absorbed by hemoglobin in the blood (e.g., 390 to 445 nm and 530 to 550 nm), it is possible to display capillaries and fine mucosal patterns on mucosal surfaces in an emphasized fashion.

In the case of irradiation with ordinary light, the color of lesions appears red, similarly to the neighboring areas. In the case of irradiation with narrow-band light described above, green and blue are absorbed, so that capillaries and fine mucosal patterns on the mucosal surfaces of lesions are emphasized and appear to float above the neighboring areas. Thus, if intense noise reduction processing is performed, fine structures in the areas of the capillaries and fine mucosal patterns on the mucosal surfaces might be lost. Therefore, it is necessary to perform noise reduction processing with a smoothing filter smaller than a predetermined size compared with other areas.

Thus, in medicine-related fields, for example, different upper-limit hue angles and lower-limit hue angles are used between the case of irradiation with ordinary light and the case of irradiation with narrow-band light. Thus, in the case where ordinary light is used, in order to perform noise reduction processing uniformly irrespective of colors, the division determining unit 204 extracts all the pixels constituting the image signals and transfers the pixels to the noise reducing unit 107. On the other hand, in the case where narrow-band light is used, in order to perform intense noise reduction processing on pixels belonging to areas other than red, the division determining unit 204 extracts pixels belonging to the areas other than red and transfers the pixels to the noise reducing unit 107.

Accordingly, in the noise reducing unit 107, noise reduction processing is performed with a smoothing filter of the predetermined size on areas of all colors of the image signals when ordinary light is used, whereas noise reduction processing is performed with a smoothing filter smaller than the predetermined size on red areas and with a smoothing filter of the predetermined size on the other areas when narrow-band light is used.

As described hereinabove, with the image-signal processing device and image capturing apparatus according to this embodiment, different upper-limit hue angles and lower-limit hue angles are used depending on illumination information, so that it becomes possible to overcome difference in the appearance of noise caused by difference in the spectral distributions of illumination devices. Accordingly, it becomes possible to perform suitable noise reduction processing in accordance with the illumination, so that it becomes possible to provide the user with images having natural image quality.

Similarly to the first embodiment described earlier, also in this embodiment, the image capturing unit 2 may be a separate image capturing apparatus. Furthermore, similar processing may be performed by causing a computer to execute an image-signal processing program.

Figure 18:
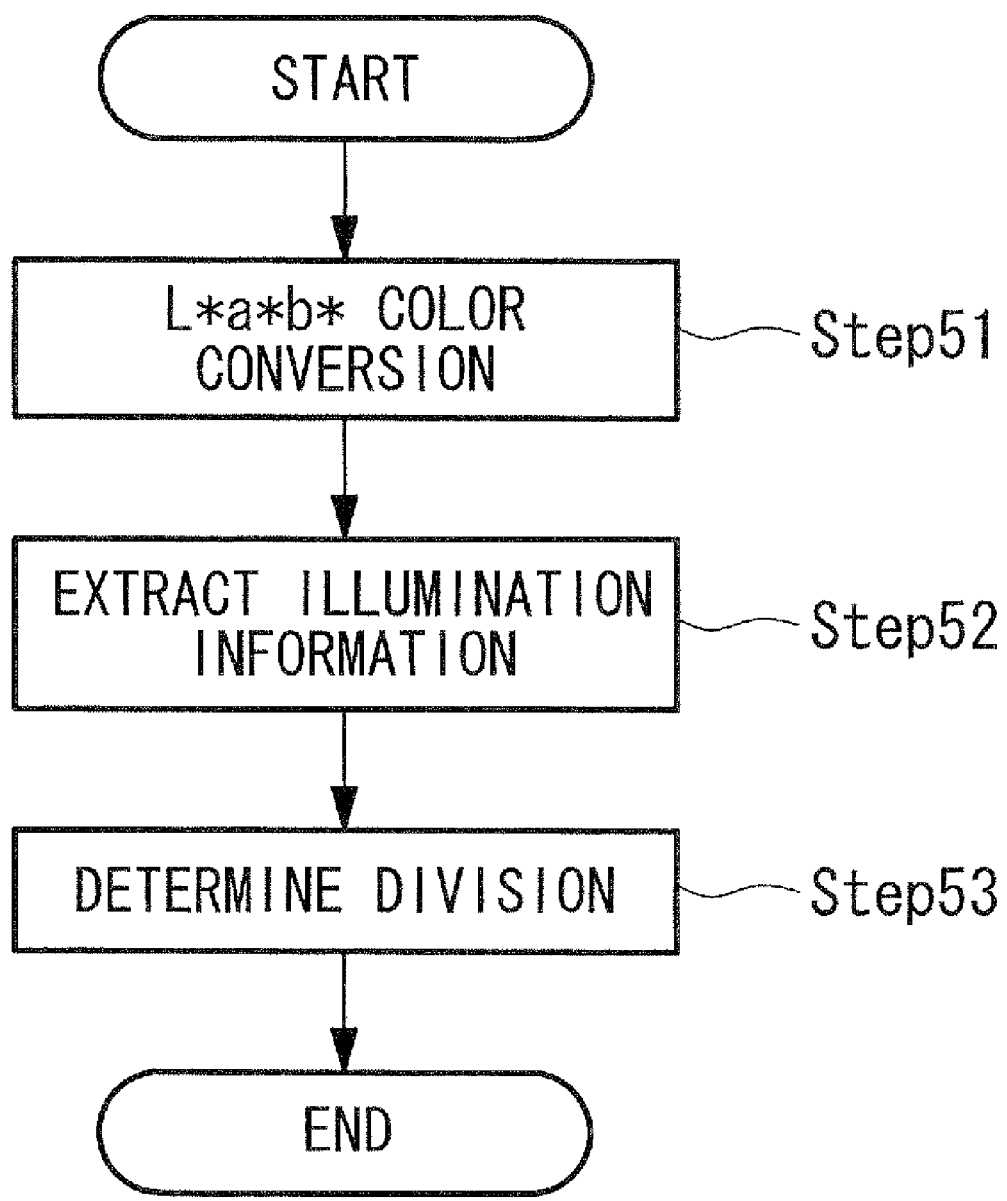
FIG. 18 is a diagram showing a processing procedure of an image-signal processing program according to the second embodiment of the present invention.

FIG. 18 is a flowchart showing area division processing by an image-signal processing program according to this embodiment.

First, a predetermined color conversion table is extracted, and RGB image signals are converted into L*a*b* image signals on the basis of the color conversion table (Step 51). This processing corresponds to the processing performed by the Lab space conversion unit 201.

Then, illumination information at the time of image capturing is extracted (Step 52). This processing corresponds to the processing performed by the illumination-information extracting unit 203.

Then, predetermined area division information is extracted on the basis of the illumination information extracted in Step 52, and processing for dividing specific color areas is performed. For each pixel of the image signals that have been read, it is determined whether the pixel belongs to the specific color areas (Step 53). This processing corresponds to the processing performed by the division determining unit 204.

Upon completion of the processing in Step 53, similarly to the first embodiment described earlier, the processing returns to the main flow shown in FIG. 11.

Third Embodiment

Next, an image-signal processing device according to a third embodiment of the present invention will be described.

The image-signal processing device according to this embodiment differs from the image-signal processing device according to the first embodiment described earlier with regard to the configuration of an area dividing unit 506.

Now, the image-signal processing device according to this embodiment will be described mainly regarding differences while omitting a description of common points with the first embodiment.

Figure 19:
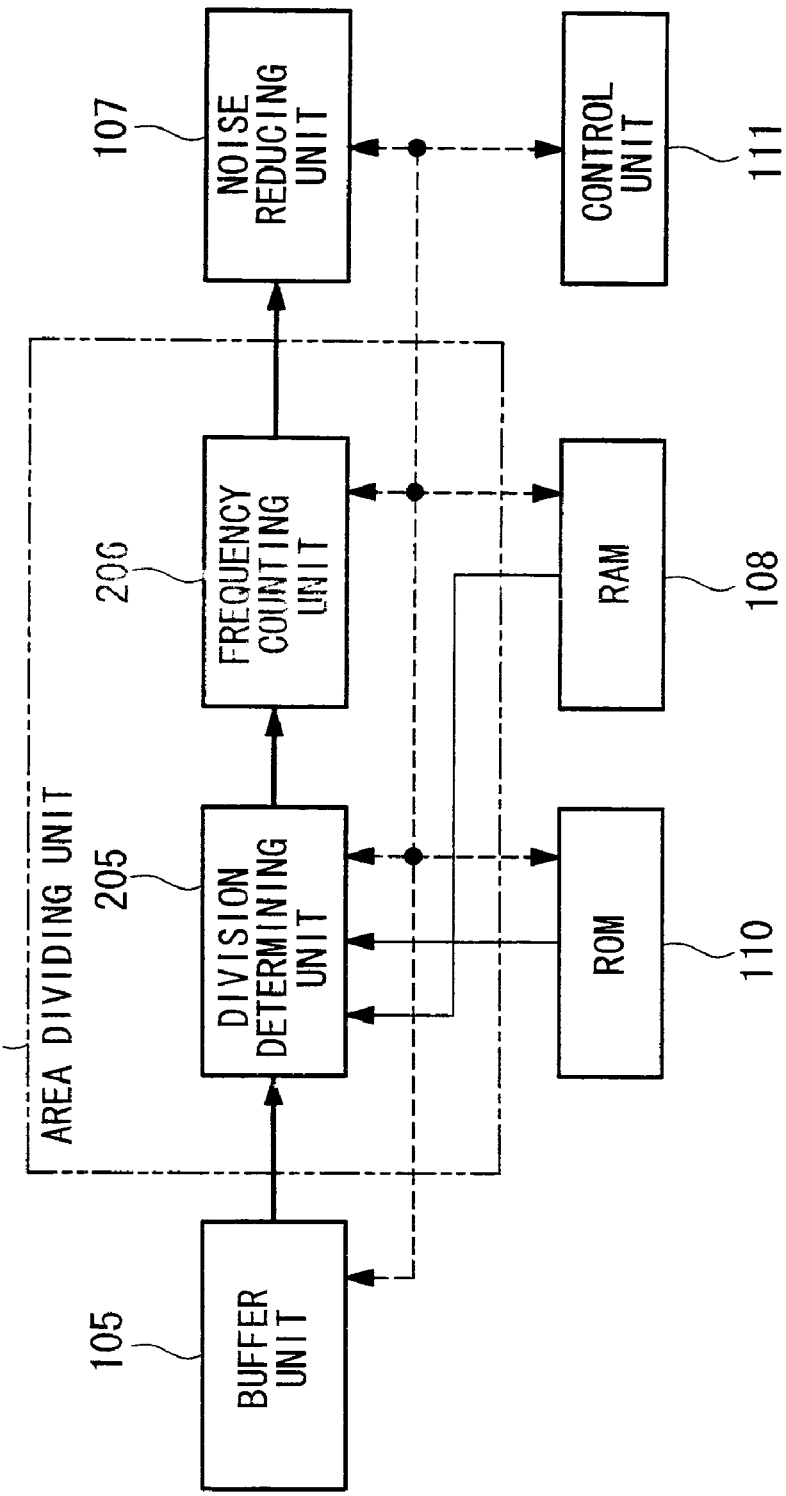
FIG. 19 is a block diagram showing an example configuration of an area dividing unit according to a third embodiment of the present invention.
Figure 20:
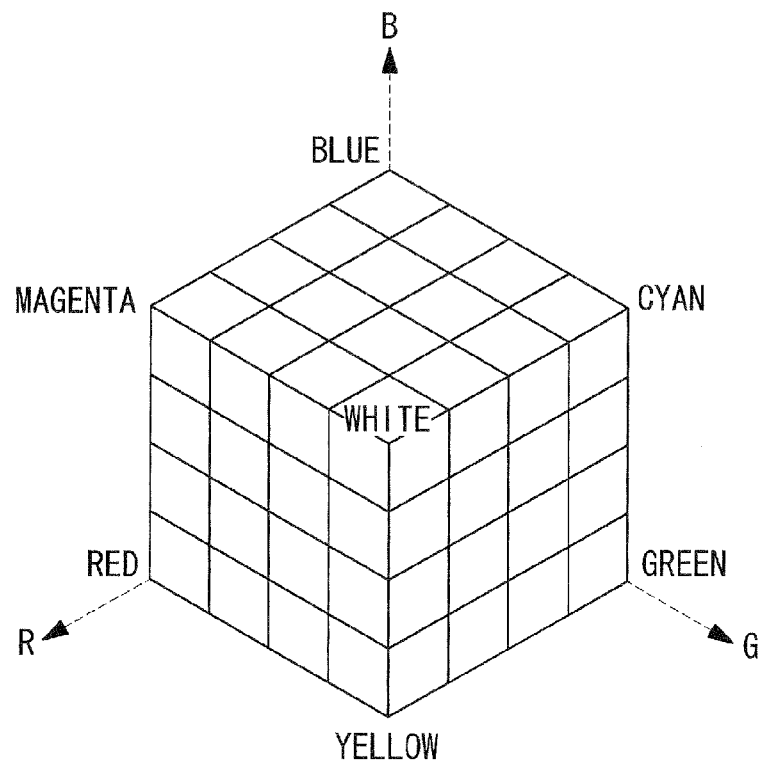
FIG. 20 is a diagram showing an example of color area information of the RGB color space.

FIG. 19 is a diagram showing an example configuration of the area dividing unit 506 according to the third embodiment of the present invention. As shown in FIG. 19, the area dividing unit 506 according to this embodiment has a configuration including a division determining unit 205 and a frequency counting unit 206. Furthermore, as shown in FIG. 20, the ROM 110 stores color area information in which the RGB color space is equally divided into a plurality of color areas.

In this configuration, upon receiving RGB image signals from the buffer unit 105, the division determining unit 205 reads out the color area information from the ROM 110 and determines which color area each pixel of the RGB image signals belongs to. This determination is performed on the basis of the RGB values of each pixel. Upon identifying the color area to which each pixel belongs in this manner, the division determining unit 205 transfers the color area information to which each pixel belongs and the RGB image signals received from the buffer unit 105 to the frequency counting unit 206.

On the basis of the RGB image signals and the color area information to which each pixel belongs, transferred from the division determining unit 205, the frequency counting unit 206 counts the number of pixels belonging to each color area. Then, the frequency counting unit 206 transfers the count value of pixels belonging to each color area and the RGB image signals transferred from the division determining unit 205 to the noise reducing unit 107.

Upon receiving the RGB image signals and the count value of pixels belonging to each color area from the frequency counting unit 206, the noise reducing unit 107 reads out a predetermined count threshold T set in advance in the ROM 110 and extracts color areas having count values greater than or equal to the count threshold T. Then, the noise reducing unit 107 executes noise reduction processing by individually using different filters on pixels belonging to the extracted color areas and pixels belonging to the other color areas.

For example, noise reduction processing is performed with the average filter FL1 shown in FIG. 6 on pixels belonging to the extracted color areas, i.e., color areas with high frequencies of occurrence, whereas noise reduction processing is performed with the average filter FL2 shown in FIG. 7 on pixels belonging to the color areas not extracted, i.e., color areas with low frequencies of occurrence.

Here, for example, the color areas with high frequencies of occurrence, i.e., color areas with large count values, occupy large areas in the image signals and have a greater effect on human vision compared with the other color areas. Thus, by varying noise reduction processing in accordance with the frequency of occurrence, it becomes possible to perform adaptive noise reduction processing in accordance with the degree of effect on human vision.

As described hereinabove, with the image-signal processing device according to this embodiment, color areas are divided, the frequency of occurrence of each of the areas is counted on the basis of image signals, and noise reduction processing is performed with smoothing filters of different sizes in accordance with the frequencies of occurrence, so that flexibility is achieved, and it becomes possible to reduce subjective noise.

The smoothing filters used for noise reduction processing are only an example, and, for example, the selection of the average filter may be reversed depending on the purpose. For example, the filter FL2 may be used for pixels belonging to color areas with high frequencies of occurrence and the filter FL1 may be used for pixels belonging to color areas with low frequencies of occurrence.

For example, in the case of ordinary portrait capturing, presumably, the frequency of occurrence of the skin color is determined as being higher than that of the other color areas. In this case, noise reduction processing should be performed on the skin color area with a smoothing filter larger than a predetermined size.

In the case of endoscope image capturing in medicine-related fields, presumably, the frequency of occurrence of red is determined as being higher than that of the other color areas. In this case, since the elimination of structures in the red areas, such as capillaries and fine patterns, by noise reduction processing would pose an obstacle to diagnosis, noise reduction processing may be performed on the red areas with a smoothing filter smaller than a predetermined size.

Although this embodiment has been described regarding the case where equally divided color area information is stored in the ROM 110 in advance, without limitation to this example, for example, the RGB color area may be divided dynamically according to a dividing number input by the user from the external I/F unit 112. Furthermore, the configuration may be such that the count threshold T can also be input or changed by the user via the external I/F unit 112.

Furthermore, although image signals are divided into a plurality of color areas in the RGB color space in this embodiment, without limitation to this embodiment, for example, pixels may be divided into color areas by using other color spaces, such as the CMYK color space.

Similarly to the first embodiment described earlier, also in this embodiment, the image capturing unit may be a separate image capturing apparatus, and similar processing may be performed by causing a computer to execute an image-signal processing program.

Figure 21:
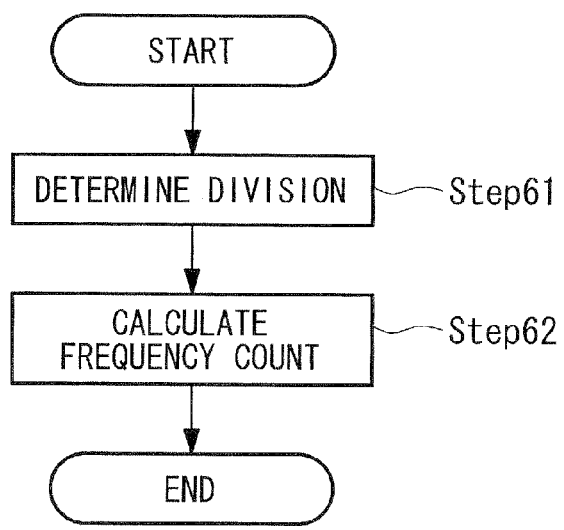
FIG. 21 is a flowchart showing a processing procedure of an image-signal processing program according to the third embodiment of the present invention.

FIG. 21 is a flowchart showing area division processing by the image-signal processing program.

First, predetermined color-space division information is extracted, and a color area is divided (Step 61). For example, as shown in FIG. 20, the RGBYCM color area is equally divided. This processing corresponds to the processing performed by the division determining unit 205.

Then, the number of pixels belonging to each color area is counted. (Step 62). This processing corresponds to the processing performed by the frequency counting unit 206.

Upon completion of the processing in Step 62, the processing then returns to the main flow shown in FIG. 11.

Fourth Embodiment

Next, an image-signal processing device according to a fourth embodiment of the present invention will be described.

In the embodiments described above, noise reduction processing for all the areas is executed by the single noise reducing unit 107. This embodiment differs from the embodiments described above in that two noise reducing units, i.e., a first noise reducing unit 607 and a second noise reducing unit 608, are provided, as shown in FIG. 22.

Now, the image-signal processing device according to this embodiment will be described mainly regarding differences while omitting a description of common points with the first embodiment.

Figure 22:
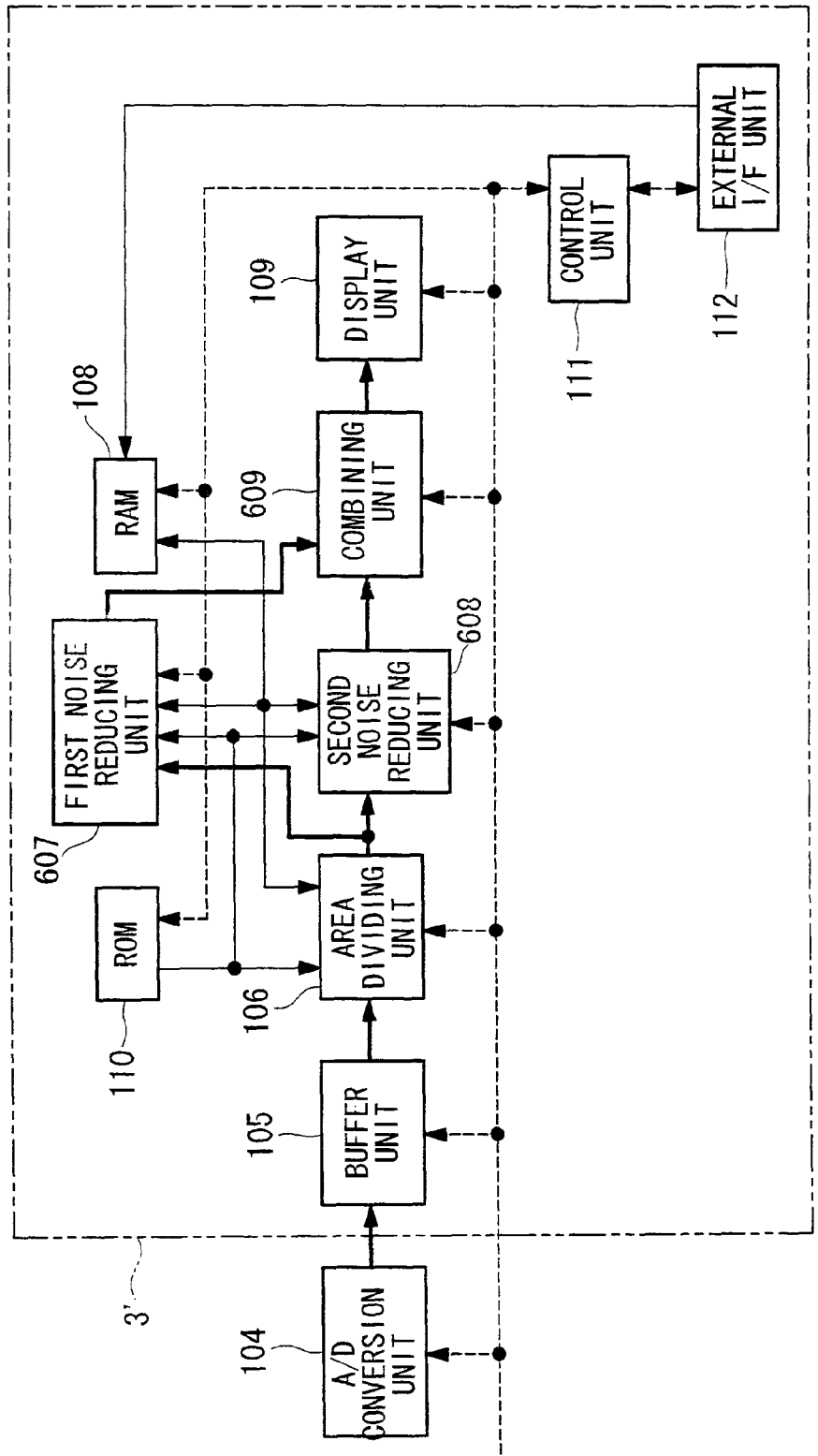
FIG. 22 is a block diagram showing an example configuration of an image-signal processing device according to a fourth embodiment of the present invention.

FIG. 22 is a diagram showing an example configuration of the image-signal processing device according to the fourth embodiment of the present invention. As shown in FIG. 22, an image-signal processing device 3' according to this embodiment includes a buffer unit 105, an area dividing unit 106, a first noise reducing unit 607, a second noise reducing unit 608, a combining unit 609, a RAM 108, a display unit 109, a ROM 110, a control unit 111, and an external I/F (interface) 112 as its main components.

The buffer unit 105 is connected to the first noise reducing unit 607 and the second noise reducing unit 608 via the area dividing unit 106. The first noise reducing unit 607 and the second noise reducing unit 608 are connected to the display unit 109 via the combining unit 609. The RAM 108 is bidirectionally connected to the area dividing unit 106, the first noise reducing unit 607, and the second noise reducing unit 608.

The ROM 110 is connected to the area dividing unit 106, the first noise reducing unit 607, and the second noise reducing unit 608. The control unit 111 is bidirectionally connected to a gain (not shown), the A/D 104, the buffer unit 105, the area dividing unit 106, the first noise reducing unit 607, the second noise reducing unit 608, the combining unit 609, the RAM 108, the display unit 109, the ROM 110, and the external I/F unit 112.

The first noise reducing unit 607 is means for performing noise reduction processing on image signals belonging to color areas considered as important, and the second noise reducing unit 608 is means for performing noise reduction processing on image signals belonging to color areas other than the color areas considered as important. Here, the first noise reducing unit 607 and the second noise reducing unit 608 execute noise reduction processing by using mutually different methods. Thus, with the image-signal processing device according to this embodiment, noise reduction processing is performed by different methods on the image signals belonging to the color areas considered as important and the image signals belonging to the other color areas.

The image signals that have been subjected to noise reduction processing by the first noise reducing unit 607 and the second noise reducing unit 608 are combined by the combining unit 609, and the combined image signals are displayed on the display unit 109.

Now, the first noise reducing unit 607 and the second noise reducing unit 608, which is a feature of the image-signal processing device 3' according to this embodiment, will be described in detail using the drawings.

Figure 23:
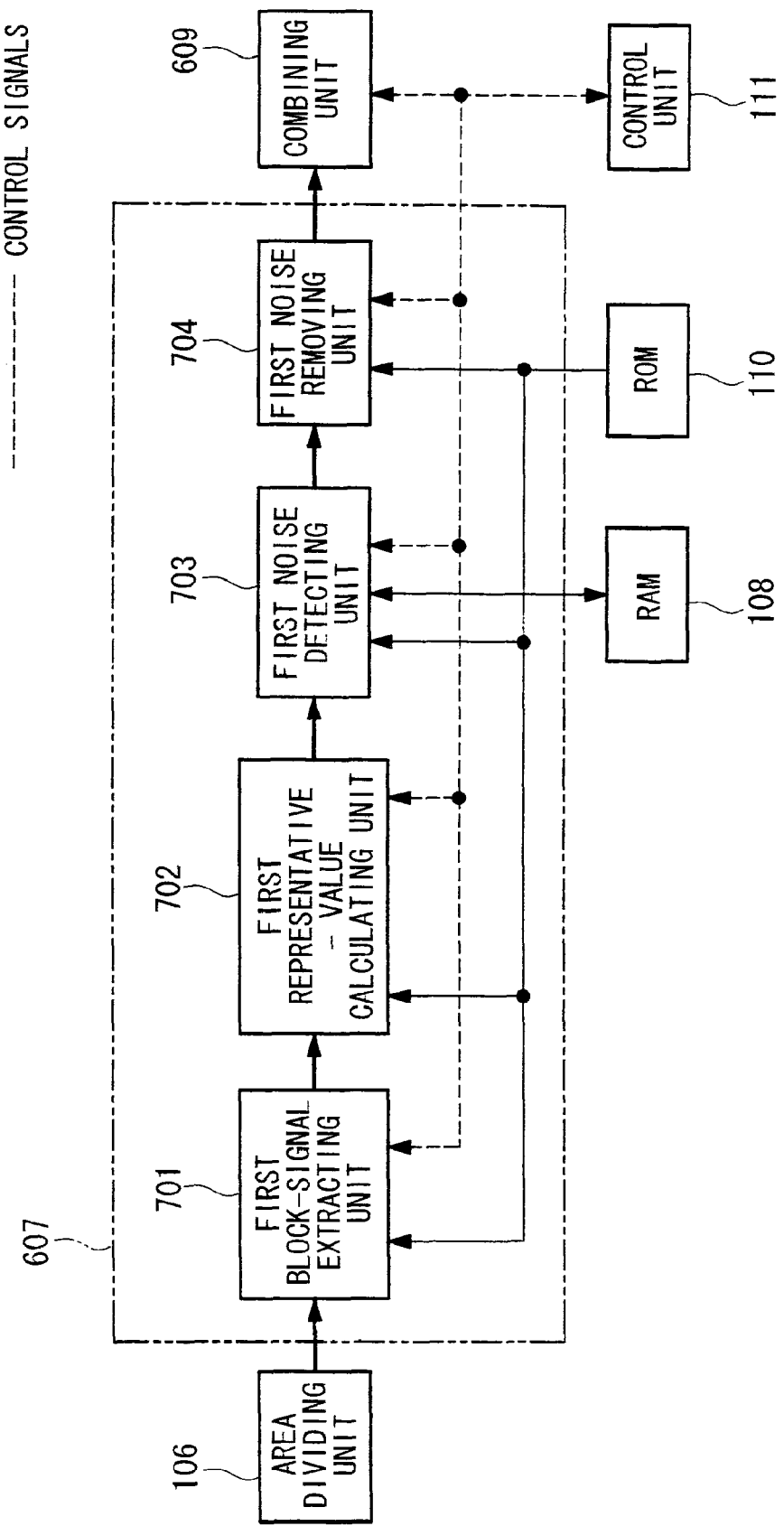
FIG. 23 is a block diagram showing an example configuration of a first noise reducing unit shown in FIG. 22.

FIG. 23 is a diagram showing an example configuration of the first noise reducing unit 607. As shown in FIG. 23, the first noise reducing unit 607 includes a first block-signal extracting unit 701, a first representative-value calculating unit 702, a first noise detecting unit 703, and a first noise removing unit 704.

In the first noise reducing unit 607, the following processing is performed in the individual units on the image signals belonging to the color areas considered as important among the image signals transferred from the area dividing unit 106. The image signals belonging to color areas other than the color areas considered as important are output to the combining unit 609 without being processed.

First, similarly to the block-signal extracting unit 301 according to the first embodiment described earlier, on the basis of the image signals belonging to the color areas considered as important, transferred from the area dividing unit 106, for each pixel of the RGB image signals transferred simultaneously therewith, the first block-signal extracting unit 701 extracts block signals having a predetermined size and centered around the pixel (hereinafter referred to as the "pixel of interest"). In this embodiment, a 5×5 block is specified as the predetermined size. The extracted block signals are transferred to the first representative-value calculating unit 702 together with the information of the color areas considered as important.

The first representative-value calculating unit 702 calculates representative values of the pixel of interest in each set of block signals. For example, in the case of image signals acquired by ordinary portrait capturing, representative values of each set of block signals are calculated individually for R, G, and B color signals by using a known median filter. In the case of image signals related to medicine, representative values of each set of block signals are calculated individually for R, G, and B color signals by using a known bilateral filter.

When representative values are calculated by using a bilateral filter as described above, it becomes possible to smooth small variations caused by noise or the like while maintaining edges in the image signals.

The representative values of the pixel of interest, calculated in the first representative-value calculating unit 702, are transferred to the first noise detecting unit 703 together with the original image signals.

Similarly to the noise detecting unit 303 according to the first embodiment, the first noise detecting unit 703 obtains noise model data corresponding to the CCD 102 individually for R, G, and B color signals from the ROM 110 and estimates noise levels individually associated with the representative values of the pixel of interest by using the noise model data. The estimated noise levels are transferred to the first noise removing unit 704.

Similarly to the noise removing unit 304 according to the first embodiment, the first noise removing unit 704 performs noise removal processing by using the noise levels and the representative values of the pixel of interest transferred from the first noise detecting unit 703. Specifically, calculation according to expressions (3) given earlier is performed, and the noise-removed image signals are transferred to the combining unit 609. Thus, image signals obtained by performing noise reduction processing only on the image signals belonging to the color areas considered as important among the input image signals are output to the combining unit 609.

Figure 24:
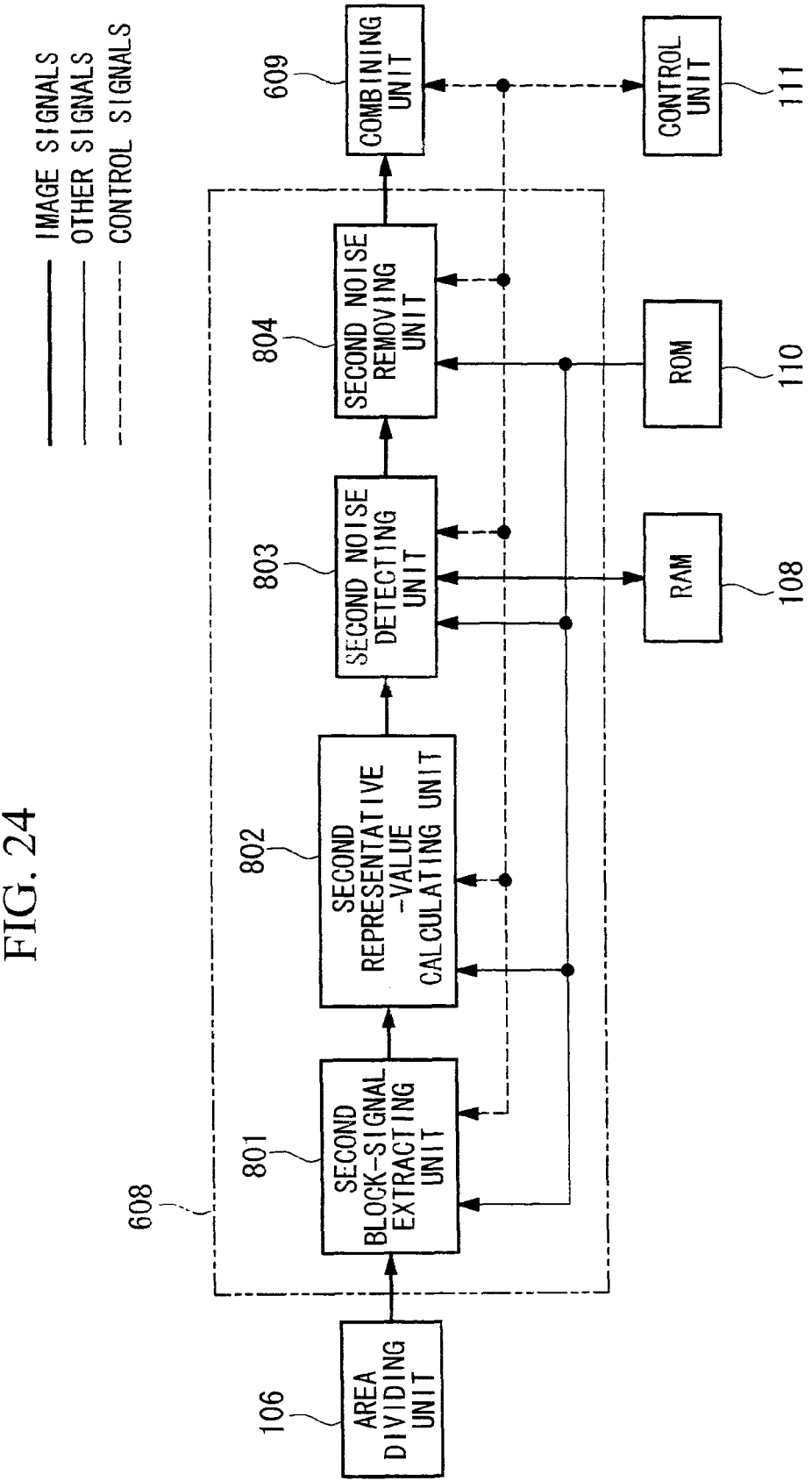
FIG. 24 is a block diagram showing an example configuration of a second noise reducing unit shown in FIG. 22.

FIG. 24 is a diagram showing an example configuration of the second noise reducing unit 608. As shown in FIG. 24, the second noise reducing unit 608 includes a second block-signal extracting unit 801, a second representative-value calculating unit 802, a second noise detecting unit 803, and a second noise removing unit 804.

In the second noise reducing unit 608, the following processing is performed in the individual units on the image signals belonging to color areas other than the color areas considered as important among the image signals transferred from the area dividing unit 106. Thus, the image signals belonging to the color areas considered as important are output to the combining unit 609 without being processed.

First, similarly to the block-signal extracting unit 301 according to the first embodiment described earlier, on the basis of the image signals belonging to color areas other than the color areas considered as important, transferred from the area dividing unit 106, from the RGB image signals transferred simultaneously therewith, the second block-signal extracting unit 801 extracts block signals having a predetermined size and centered around each pixel of interest. In this embodiment, a 5×5 block is specified as the predetermined size. The extracted block signals are transferred to the second representative-value calculating unit 802 together with the information of the color areas considered as important.

The second representative-value calculating unit 802 calculates representative values of the pixel of interest in each set of block signals. For example, in the case of image signals acquired by ordinary portrait capturing, representative values of each set of block signals are calculated individually for R, G, and B color signals by using a known bilateral filter. In the case of image signals related to medicine, representative values of each set of block signals are calculated individually for R, G, and B color signals by using a known median filter.

The representative values of the pixel of interest, calculated in the second representative-value calculating unit 802, are transferred to the second noise detecting unit 803 together with the original image signals.

Similarly to the noise detecting unit 303 according to the first embodiment, the second noise detecting unit 803 obtains noise model data corresponding to the CCD 102 individually for R, G, and B color signals from the ROM 110 and estimates noise levels individually associated with the representative values of the pixel of interest by using the noise model data. The estimated noise levels are transferred to the second noise removing unit 804.

Similarly to the noise removing unit 304 according to the first embodiment, the second noise removing unit 804 performs noise removal processing by using the noise levels and the representative values of the pixel of interest transferred from the second noise detecting unit 803. Specifically, calculation according to expressions (3) or (4) given earlier is performed, and the noise-removed image signals are transferred to the combining unit 609. Thus, image signals obtained by performing noise reduction processing only on the image signals belonging to color areas other than the color areas considered as important among the input image signals are output to the combining unit 609.

The combining unit 609 combines the image signals from the first noise reducing unit 607 and the image signals from the second noise reducing unit 608 and transfers the combined image signals to the display unit 109.

As described above, with the image-signal processing device according to this embodiment, for example, in the case of ordinary portrait capturing, for image signals belonging to the skin-color and sky-color areas, which are considered as important, noise reduction processing is performed by calculating representative values of each pixel of interest with a known median filter, so that it is possible to sufficiently reduce noise in these areas and also to reduce processing time. On the other hand, for areas other than the colors considered as important, noise reduction processing is performed by calculating representative values with a known bilateral filter, so that it becomes possible to reduce noise while maintaining edge components in these areas.

In the case of image signals related to medicine, for color areas that are considered as important for medical diagnosis, such as blood vessels, blood, internal organs, and fat, noise reduction processing is performed by calculating representative values of each pixel of interest with a known bilateral filter, so that thin blood vessels, fine structures, and so forth are maintained. On the other hand, for areas other than the colors considered as important, noise reduction processing is performed by calculating representative values with a known median filter, so that it is possible to sufficiently reduce noise and also to reduce processing time.

Although representative values are calculated with a bilateral filter and a median filter in the first noise reduction unit 607 and the second noise reduction unit 608 in the embodiment described above, without limitation to this example, representative values of each pixel of interest may be calculated with other known filters or by using other known methods.

Furthermore, although the filters are the same in the first noise reduction unit 607 and the second noise reduction unit 608, representative values of each pixel of interest may be calculated by individually using filters of different sizes.

Furthermore, in the first noise reduction unit 607 and the second noise reduction unit 608 described above, noise reduction processing may be performed on each area by using one or a combination of the various types of noise reduction processing described earlier in the first to third embodiments.

As described above, with the image-signal processing device 3' according to this embodiment, different noise reduction processing is performed on important color areas and the other areas on the basis of color information of image signals, so that it becomes possible to reduce subjectively noticeable noise.

Similarly to the first embodiment described earlier, also in this embodiment, the image capturing unit may be a separate image capturing apparatus, and similar processing may be performed by causing a computer to execute an image-signal processing program.

Figure 25:
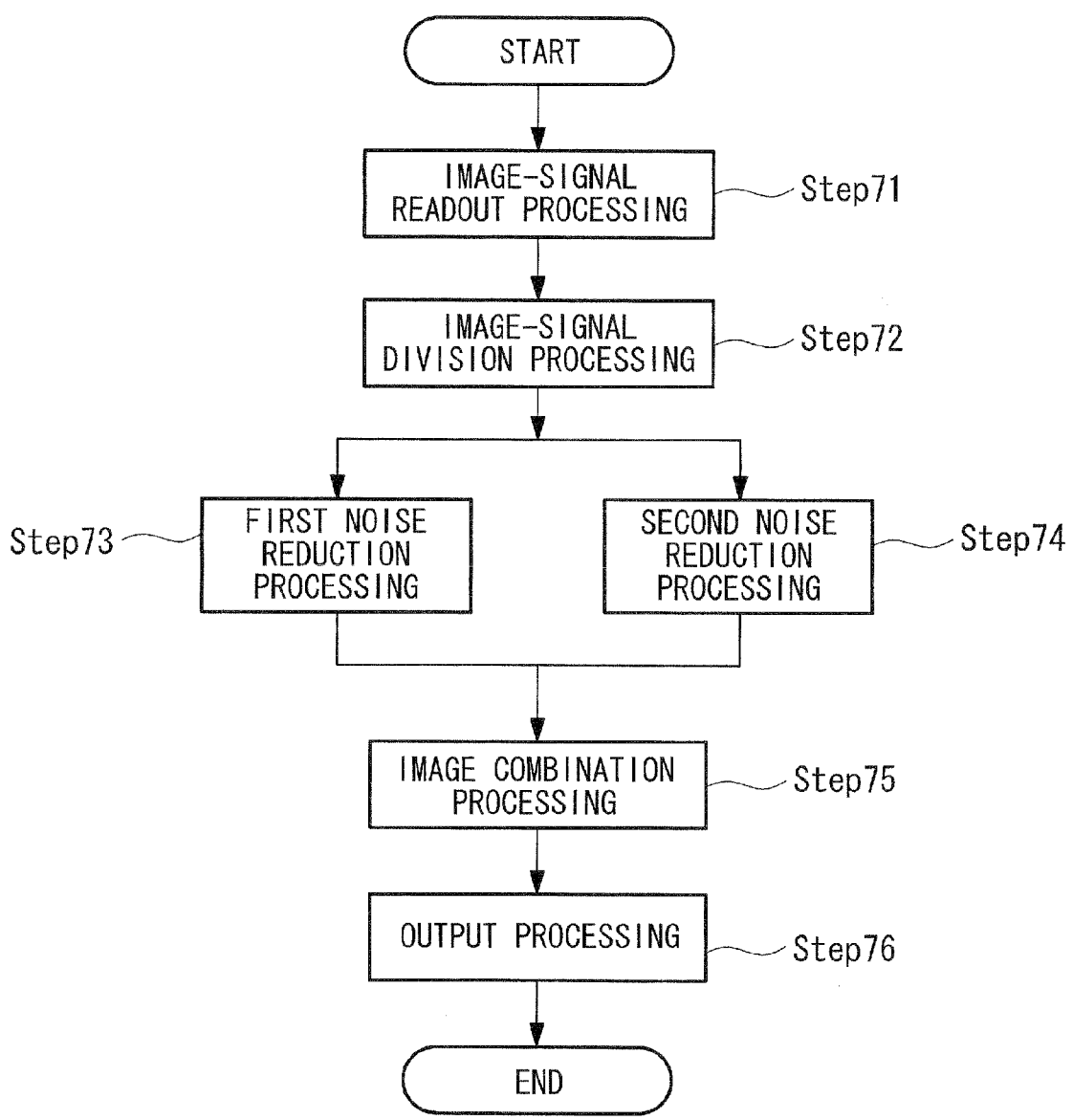
FIG. 25 is a flowchart showing a processing procedure of an image-signal processing program according to the fourth embodiment of the present invention.

FIG. 25 is a flowchart showing a processing procedure based on the image-signal processing program.

First, RGB image signals, the header information, and so forth are read out from a recording medium or the like, and information such as γ characteristic data included in advance in the image-signal processing program is read out (Step 71).

Then, on the basis of a predetermined parameter, processing for dividing the RGB image signals that have been read out is performed (Step 72). This processing corresponds to the processing performed by the area dividing unit 106 described earlier.

Then, on the basis of the area division information of Step 72, first noise reduction processing is performed on each pixel of image signals belonging to color areas considered as important (Step 73). This processing corresponds to the processing performed by the first noise reducing unit 607 described earlier.

Furthermore, in parallel with the processing in Step 73 above, second noise reduction processing is performed on each pixel of image signals in areas other than the color areas considered as important (Step 74). This processing corresponds to the processing performed by the second noise reducing unit 608 described earlier.

Then, combination processing for combining the image signals subjected to the first noise reduction processing in Step 73 and the image signals subjected to the second noise reduction processing in Step 74 is performed (Step 75). This processing corresponds to the processing performed by the combining unit 609 described earlier.

Finally, the combined image signals are output, thus completing the processing. For example, the output combined image signals are displayed on a display device or saved on a memory card or the like.

Figure 26:
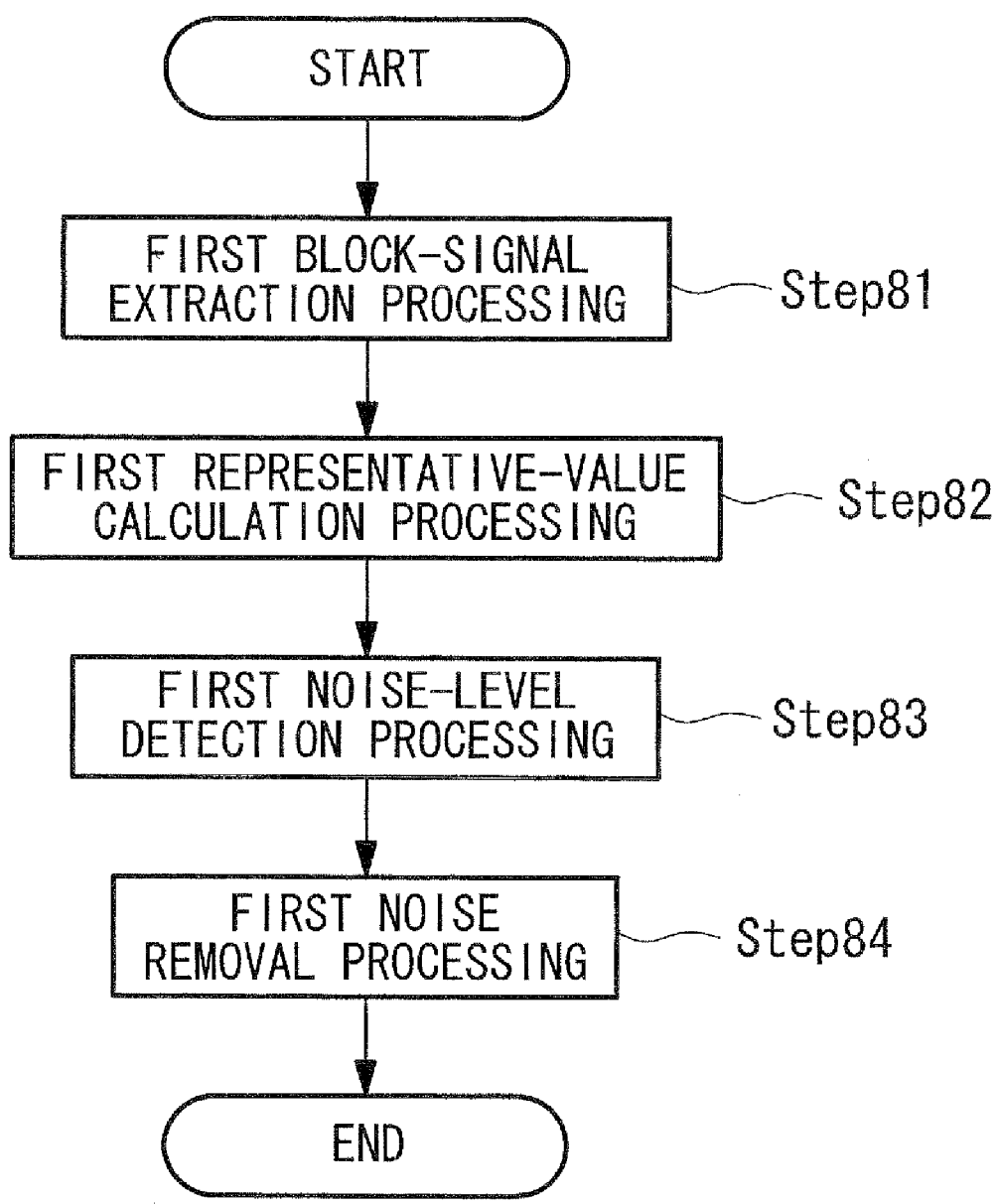
FIG. 26 is a flowchart showing a processing procedure of the image-signal processing program according to the fourth embodiment of the present invention.

FIG. 26 is a flowchart showing details of the first noise reduction processing in Step 73 of FIG. 25.

First, on the basis of the information of color areas from Step 72, block signals centered around a pixel of interest are extracted from the RGB image signals. Specifically, when the pixel of interest belongs to a color area considered as important, block signals of a predetermined size are extracted individually for R, G, and B color signals (Step 81). When the pixel of interest does not belong to any color area considered as important, this processing is completed without performing processing. This processing corresponds to the processing performed by the first block-signal extracting unit 701.

Then, when the pixel of interest belongs to a color area considered as important, representative values of the pixel of interest of each set of block signals are calculated individually for R, G, and B colors by using a predetermined smoothing filter (Step 82). This processing corresponds to the processing performed by the first representative-value calculating unit 702.

Then, noise levels of the pixel of interest of each set of block signals are estimated by using the representative values calculated in Step 82 (Step 83). This processing corresponds to the processing performed by the first noise detecting unit 703.

Then, first noise removal processing is performed on the basis of the noise levels estimated in Step 83 (Step 84). For example, noise removal processing is performed on each pixel according to expressions (3) or (4) given earlier. This processing corresponds to the processing performed by the first noise removing unit 704.

Upon completion of the processing in Step 84, the processing is completed, and the processing returns to Step 75 of the flow shown in FIG. 25.

Figure 27:
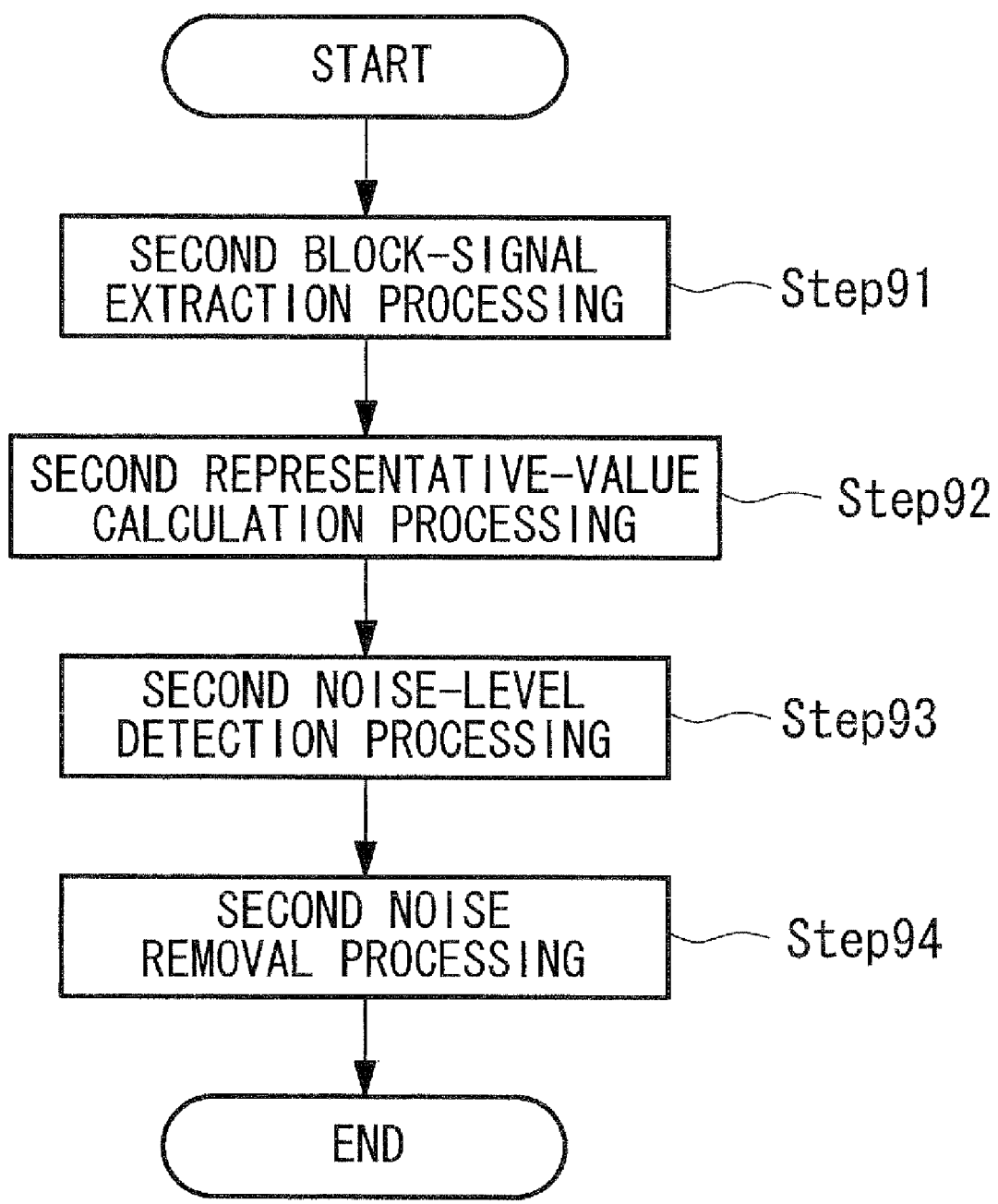
FIG. 27 is a flowchart showing a processing procedure of the image-signal processing program according to the fourth embodiment of the present invention.

FIG. 27 is a flowchart showing details of the second noise reduction processing in Step 74 of FIG. 25.

First, on the basis of the information of color areas from Step 72, block signals centered around a pixel of interest are extracted from the RGB image signals. Specifically, when the pixel of interest belongs to a color area other than the color areas considered as important, block signals of a predetermined size are extracted individually for R, G, and B color signals (Step 91). At this time, when the pixel of interest belongs to a color area considered as important, this processing is completed without performing processing. This processing corresponds to the processing performed by the second block-signal extracting unit 801.

Then, when the pixel of interest belongs to a color area other than the color areas considered as important, representative values of the pixel of interest of each set of block signals are calculated individually for R, G, and B colors by using a predetermined smoothing filter different from the smoothing filter used in the first noise reduction processing (Step 92). This processing corresponds to the processing performed by the second representative-value calculating unit 802.

Then, noise levels of the pixel of interest of each set of block signals are estimated by using the representative values calculated in Step 92 (Step 93). This processing corresponds to the processing performed by the second noise detecting unit 803.

Then, second noise removal processing is performed on the basis of the noise levels estimated in Step 93 (Step 94). For example, noise removal processing is performed on each pixel according to expressions (3) or (4) given earlier. This processing corresponds to the processing performed by the second noise removing unit 804.

Upon completion of the processing in Step 94, the processing is completed, and the processing returns to Step 75 of the flow shown in FIG. 25.

The present invention is not limited to the exact embodiments described above, and may be embodied at the time of implementation with modifications of the components without departing from the spirit thereof. Furthermore, various inventions may be conceived by suitably combining a plurality of components disclosed in the embodiments. For example, some components may be omitted from all the components described in the embodiments. Furthermore, components in different embodiments may be suitably combined. It is obvious that various modifications and applications are possible without departing from the spirit of the invention as described above.

What is claimed is:

1. An image-signal processing device comprising:
   an area dividing unit that divides image signals into a plurality of areas based on color information; and
   a plurality of noise reducing units which perform noise reduction processing by using different methods for individual ones of the plurality of areas of the image signals divided by the area dividing unit,
   wherein one of the plurality of noise reducing units is respectively selected for each of the plurality of areas, and the noise reduction processing for a given area is performed by using the respective selected noise reducing unit therefor, and
   wherein each of the noise reducing units includes:
      a block-signal extracting unit that extracts block signals centered around a pixel of interest and having a predetermined size from the image signals;
      a representative-value calculating unit that determines a representative value of the pixel of interest of the block signals based on the extracted block signals;
      a noise-level detecting unit that estimates a noise level based on the representative value of the pixel of interest and a noise model registered in advance; and
      a noise removing unit that performs noise reduction processing based on the estimated noise level.

2. The image-signal processing device according to claim 1, wherein the noise reducing units perform the noise reduction processing for the areas by using different smoothing filters.

3. The image-signal processing device according to claim 2,
   wherein types of the smoothing filters used in determining the representative values by the representative-value calculating units of the noise reducing units are different from each other.

4. The image-signal processing device according to claim 1, wherein each of the noise reducing units adjusts a parameter value used for the noise reduction processing in accordance with the given area and performs the noise reduction processing for the given area by using the adjusted parameter value.

5. The image-signal processing device according to claim 1, wherein the area dividing unit divides the image signals into the plurality of areas in the L*a*b* signal space.

6. The image-signal processing device according to claim 1, further comprising a storage unit that stores area division information in which information of a color area that is considered as important in medical image signals is registered,
   wherein the area dividing unit divides the image signals into the plurality of areas when it is determined that the image signals belong to the color area registered in the area division information.

7. The image-signal processing device according to claim 6, wherein the storage unit stores the area division information in association with light sources, and
   wherein the area dividing unit reads out the area division information associated with an image capturing type at a time of acquisition of the image signals from the storage unit and divides the image signals into a plurality of areas by using the area division information that has been read out.

8. An image-signal processing device according to claim 1, wherein the area dividing unit divides the image signals into the plurality of areas based on frequencies of occurrence of colors included in the image signals.

9. The image-signal processing device according to claim 1, further comprising a storage unit that stores color area information defined by dividing the RGB signal space or the CMY signal space into a plurality of color areas,
   wherein the area dividing unit includes:
      a division determining unit that identifies the color area to which each pixel of the image signals belongs based on the color area information stored in the storage unit; and
      a frequency counting unit that counts a number of pixels in each of the color areas, and
   wherein the image signals are divided into the plurality of areas according to count values obtained by the frequency counting unit.

10. The image-signal processing device according to claim 1, wherein the area dividing unit divides the image signals into a plurality of color areas based on information of light sources used at a time of acquisition of the image signals.

11. A non-transitory computer readable recording medium having an image-signal processing program stored thereon for causing a computer to execute functions comprising:
   dividing image signals into a plurality of areas based on color information; and
   performing noise reduction processing on individual ones of the plurality of areas of the divided image signals in accordance with color characteristics of the areas;
   wherein performing the noise reduction includes estimating a noise level based on a noise model, and estimating the noise level includes:

extracting block signals centered around a pixel of interest and having a predetermined size from the image signals;

extracting a representative value of the pixel of interest based on the block signals; and calculating a noise level based on the representative value of the pixel of interest and the noise model; and wherein the noise reduction processing is performed on the image signals based on the estimated noise level.

12. The recording medium according to claim 11, wherein in dividing the image signals, the image signals are divided into a plurality of color areas of based on information of light sources used at a time of acquisition of the image signals.

13. An image capturing apparatus comprising the image-signal processing device according to claim 1.

* * * * *